United States Patent
Koohi et al.

(10) Patent No.: US 12,474,175 B2
(45) Date of Patent: Nov. 18, 2025

(54) SYSTEM AND METHOD FOR OPTIMIZING DELIVERY ROUTE BASED ON MOBILE DEVICE ANALYTICS

(71) Applicant: United States Postal Service, Washington, DC (US)

(72) Inventors: Anoosha Koohi, McLean, VA (US); Charles P. McLellan, Fairfax, VA (US)

(73) Assignee: United States Postal Service, Washington, DC (US)

(*) Notice: Subject to any disclaimer, the term of this patent is extended or adjusted under 35 U.S.C. 154(b) by 265 days.

(21) Appl. No.: 17/067,498

(22) Filed: Oct. 9, 2020

(65) Prior Publication Data

US 2021/0108935 A1    Apr. 15, 2021

Related U.S. Application Data

(60) Provisional application No. 62/914,027, filed on Oct. 11, 2019.

(51) Int. Cl.
*G06Q 10/047* (2023.01)
*G01C 21/34* (2006.01)
(Continued)

(52) U.S. Cl.
CPC .......... *G01C 21/3453* (2013.01); *G01S 19/42* (2013.01); *G01S 19/52* (2013.01);
(Continued)

(58) Field of Classification Search
CPC ...... G06Q 10/08; G06Q 50/04; G06Q 10/047; G06Q 10/08355; G06Q 30/0205;
(Continued)

(56) References Cited

U.S. PATENT DOCUMENTS 10,259,466 B2* 4/2019 Memani ................. G07C 5/008
10,540,830 B2* 1/2020 Davidson ................ G07C 5/02
(Continued)

OTHER PUBLICATIONS

Hoon Jung, et al.; "Integration of GIS, GPS, and optimization technologies for the effective control of parcel delivery service"; Sep. 2006; Computers & Industrial Engineering, vol. 51, Issue 1; pp. 154-162; https://www.sciencedirect.com/science/article/pii/S0360835206000726 (Year: 2006).*

*Primary Examiner* — Shannon S Campbell
*Assistant Examiner* — David G. Godbold
(74) *Attorney, Agent, or Firm* — Knobbe, Martens, Olson & Bear, LLP

(57) ABSTRACT

In one aspect, a system for analyzing a route traveled by an item carrier is disclosed. The system comprises a memory circuit and a hardware processor. The memory circuit is configured to store location data points and acceleration data points received from sensors. The hardware processor is configured to receive the location and the acceleration data points from the sensors, store the location and acceleration data points in the memory circuit, and filter the stored location data points to remove a subset of location data points that represent or indicate scatter. The hardware processor is configured to identify the route traveled by the item carrier, filter the stored acceleration data points, identify a state of the item carrier for each of the filtered acceleration data points based on an analysis of the filtered acceleration data points, and verify the identified state of the item carrier.

19 Claims, 20 Drawing Sheets

(51) Int. Cl.

| | |
|---|---|
| *G01S 19/42* | (2010.01) |
| *G01S 19/52* | (2010.01) |
| *G06Q 10/0833* | (2023.01) |
| *G06Q 10/0835* | (2023.01) |
| *G07C 5/00* | (2006.01) |
| *G07C 5/08* | (2006.01) |
| *G06Q 30/0204* | (2023.01) |
| *G06Q 50/26* | (2012.01) |

(52) U.S. Cl.
CPC ....... *G06Q 10/047* (2013.01); *G06Q 10/0833* (2013.01); *G06Q 10/08355* (2013.01); *G07C 5/008* (2013.01); *G07C 5/0841* (2013.01); *G06Q 30/0205* (2013.01); *G06Q 50/26* (2013.01)

(58) Field of Classification Search
CPC .... G06Q 50/62; G01C 21/3453; G01C 5/008; G01C 5/0841; G01S 19/42; G01S 19/52; C01C 21/3446
See application file for complete search history.

(56) References Cited

U.S. PATENT DOCUMENTS

| | | | |
|---|---|---|---|
| 10,990,911 B2* | 4/2021 | Tanno ................. G06Q 10/047 |
| 2011/0202225 A1* | 8/2011 | Willis ................. G01C 25/005 |
| | | | 702/85 |
| 2011/0202305 A1* | 8/2011 | Willis .................... G07C 5/085 |
| | | | 702/141 |
| 2015/0170031 A1* | 6/2015 | Attar ...................... G08G 1/005 |
| | | | 706/46 |
| 2015/0226563 A1* | 8/2015 | Cox .................. G01C 21/3469 |
| | | | 701/29.1 |
| 2016/0063005 A1* | 3/2016 | Sisbot .................... H04L 67/10 |
| | | | 707/754 |
| 2016/0089080 A1* | 3/2016 | Li ........................... G01P 15/00 |
| | | | 702/141 |
| 2016/0357262 A1* | 12/2016 | Ansari ................... G06V 20/59 |
| 2019/0102840 A1* | 4/2019 | Perl ........................ G06Q 40/08 |
| 2019/0204110 A1* | 7/2019 | Dubielzyk ......... G01C 21/3697 |
| 2020/0294401 A1* | 9/2020 | Kerecsen ............. G05D 1/0287 |
| 2021/0375074 A1* | 12/2021 | Deng ...................... G08B 13/02 |
| 2022/0169258 A1* | 6/2022 | Samarthyam ............ G08G 1/20 |

* cited by examiner

SYSTEM AND METHOD FOR OPTIMIZING DELIVERY ROUTE BASED ON MOBILE DEVICE ANALYTICS

CROSS-REFERENCE TO RELATED APPLICATIONS

This application claims the benefit of priority to U.S. Provisional application No. 62/914,027 filed Oct. 11, 2019, the entire contents of which are hereby incorporated by referenced herein for all purposes. Any and all applications for which a foreign or domestic priority claim is identified in the Application Data Sheet as filed with the present application are hereby incorporated by reference under 37 CFR 1.57.

BACKGROUND

Item deliverers are generally assigned routes, or sequences of stops at particular addresses, for which they deliver items on a regular (for example, daily) basis. However, some routes can be significantly more difficult than others, such as routes that are significantly longer in distance compared to other routes with similar numbers of stops, routes that have large amounts of elevation gain, or route that involve more time for the item deliverers out of their delivery resources (for example, delivery vehicles). It can be advantageous to optimize the routes that item deliverers deliver items on based on the difficulties of the routes. Such optimization utilizes analysis of the routes, which can be a computationally intensive process. Improvements on such analysis are desirable.

SUMMARY

Methods and apparatuses or devices disclosed herein each have several aspects, no single one of which is solely responsible for its desirable attributes. Without limiting the scope of this disclosure, for example, as expressed by the claims, which follow, its more prominent features will now be discussed briefly. After considering this discussion, and particularly after reading the section entitled "Detailed Description" one will understand how the described features provide advantages that include data authentication services.

In one aspect, a system for analyzing a route traveled by an item carrier is disclosed. The system comprises a communication circuit, a memory circuit, and a hardware processor. The communication circuit is configured to receive data points via a communication link. The memory circuit is configured to store location data points and acceleration data points received from one or more sensors. The hardware processor is configured to receive the location and the acceleration data points from the one or more sensors, store the location and acceleration data points in the memory circuit, and filter the stored location data points to remove a subset of location data points that represent or indicate scatter. The hardware processor is also configured to identify the route traveled by the item carrier, filter the stored acceleration data points, identify a state of the item carrier for each of the filtered acceleration data points based on an analysis of the filtered acceleration data points, and verify the identified state of the item carrier for each of the filtered acceleration data points.

In some aspects, the location data points comprise global positioning system (GPS) location data points received from a GPS device carried by the item carrier or placed within a vehicle driven by the item carrier. In some aspects, the filtered acceleration data points comprise GPS location and time data points and the hardware processor is further configured to determine acceleration values based on analyzing the GPS location and time data points. In some aspects, the identified state of the item carrier is one of walking, stopped, and driving. In some aspects, the hardware processor is configured to identify the state of the item carrier for each of the filtered acceleration data points comprises the hardware processor configured to analyze the filtered acceleration data points to determine whether the item carrier is taking steps based on comparing the filtered acceleration data points to an acceleration threshold. In some aspects, the hardware processor is configured to verify the identified state of the item carrier for each of the received acceleration data points comprises the hardware processor configured to: apply, for the each of the received acceleration data points, an algorithm to the acceleration data points within a threshold period of the each of the received acceleration data points and determine, for the each of the received acceleration data points, that the identified state is consistent with the acceleration data points within the threshold period of the each of the received acceleration data points.

In some aspects, the identified state of the item carrier is one of driving, turning, and reversing. In some aspects, when the identified state of the item carrier is driving, the hardware processor is further configured to identify at least one driving action taken by the item carrier. In some aspects, the at least one driving action comprises at least one of turning, reversing, aggressive accelerating, and aggressive decelerating. In some aspects, the hardware processor configured to identify the at least one driving action taken by the item carrier comprises the hardware processor configured to: generate a plurality of vectors between a first set of data points and a second set of data points, identify at least one angle between the generated plurality of vectors, and select one of the turning and reversing driving action based at least in part on the identified at least one angle.

In another aspects, a method of analyzing a route traveled by an item carrier is disclosed. The method comprises receiving data points via a communication link, storing location data points and acceleration data points received from one or more sensors, receiving the location and the acceleration data points from the one or more sensors, and storing the location and acceleration data points in the memory circuit. The method further comprises filtering the stored location data points to remove a subset of location data points that represent or indicate scatter, identifying the route traveled by the item carrier, filtering the stored acceleration data points, identifying a state of the item carrier for each of the filtered acceleration data points based on an analysis of the filtered acceleration data points, and verifying the identified state of the item carrier for each of the filtered acceleration data points.

In some aspects, the location data points comprise global positioning system (GPS) location data points received from a GPS device carried by the item carrier or placed within a vehicle driven by the item carrier. In some aspects, the filtered acceleration data points comprise GPS location and time data points and wherein the hardware processor is further configured to determine acceleration values based on analyzing the GPS location and time data points. In some aspects, the identified state of the item carrier is one of walking, stopped, and driving. In some aspects, identifying the state of the item carrier for each of the filtered acceleration data points comprises analyzing the filtered acceleration data points to determine whether the item carrier is taking steps based on comparing the filtered acceleration data points to an acceleration threshold. In some aspects, verifying the identified state of the item carrier for each of the received acceleration data points comprises: applying, for the each of the received acceleration data points, an algorithm to the acceleration data points within a threshold period of the each of the received acceleration data points and determining, for the each of the received acceleration data points, that the identified state is consistent with the acceleration data points within the threshold period of the each of the received acceleration data points. In some aspects, when the identified state of the item carrier is driving, the hardware processor is further configured to identify at least one driving action taken by the item carrier. In some aspects, the at least one driving action comprises at least one of turning, reversing, aggressive accelerating, and aggressive decelerating. In some aspects, identifying the at least one driving action taken by the item carrier comprises: generating a plurality of vectors between a first set of data points and a second set of data points, identifying at least one angle between the generated plurality of vectors, and selecting one of the turning and reversing driving action based at least in part on the identified at least one angle.

In another aspects, a non-transitory computer readable medium comprising instructions for implementation by at least one computer processor are disclosed. The instructions cause the computer processor to perform the steps of receiving data points via a communication link, storing location data points and acceleration data points received from one or more sensors, receiving the location and the acceleration data points from the one or more sensors, and storing the location and acceleration data points in the memory circuit. In some aspects, the instructions further cause the computer processor to perform the steps of filtering the stored location data points to remove a subset of location data points that represent or indicate scatter, identifying the route traveled by the item carrier, filtering the stored acceleration data points, identifying a state of the item carrier for each of the filtered acceleration data points based on an analysis of the filtered acceleration data points, and verifying the identified state of the item carrier for each of the filtered acceleration data points.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

DETAILED DESCRIPTION

Figure 1:
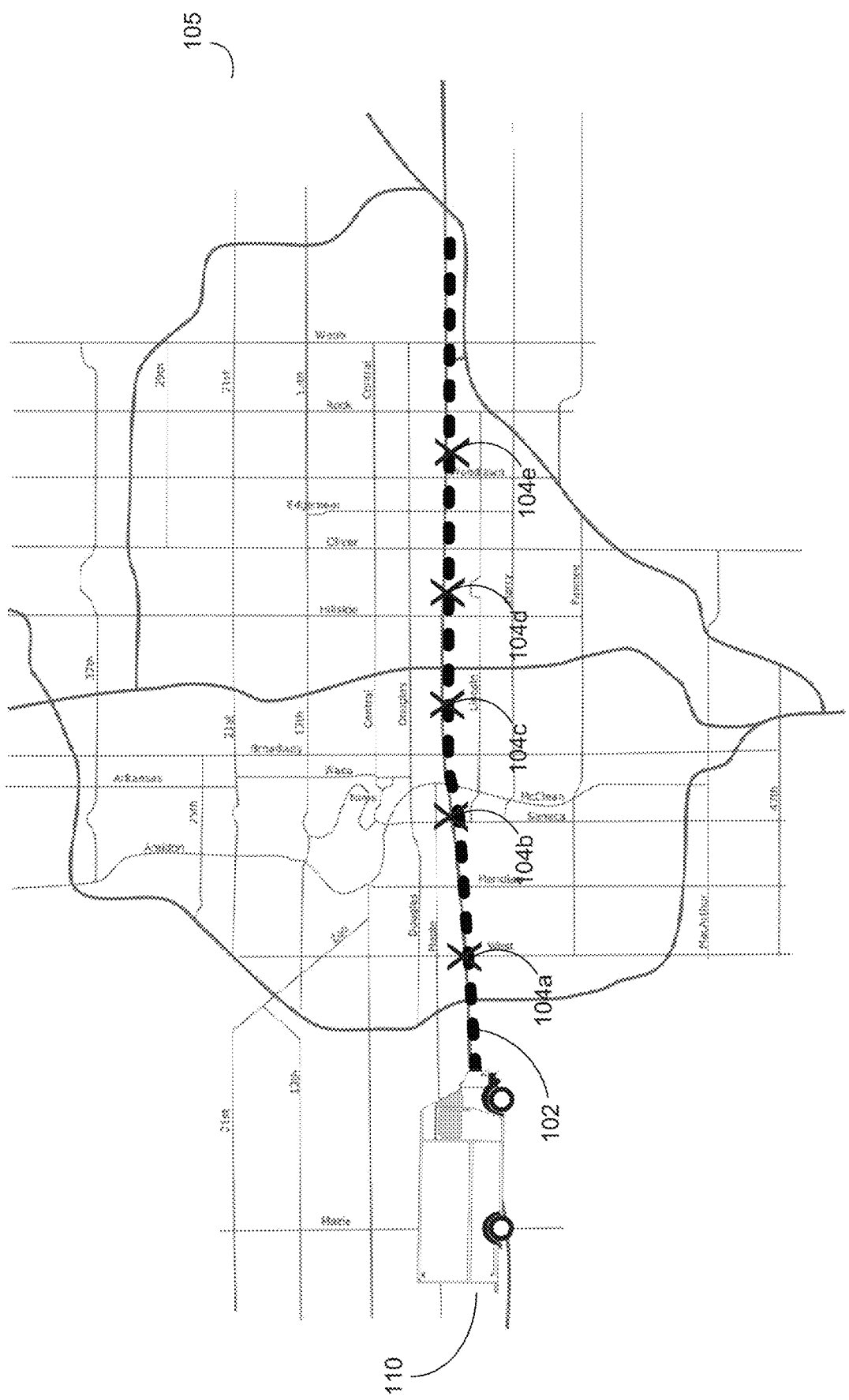
FIG. 1 is an overview diagram of a geographic region in which a delivery system (not shown) is implemented.

Some embodiments of systems and methods for the analysis and/or optimization of delivery routes based on mobile device analytics are contained herein. The features, aspects, and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

Analysis and/or optimization of delivery routes based on mobile device analytics may involve intensive computing resources. The analysis and/or optimization of the delivery routes may utilize data received from devices contained within delivery resources (for example, delivery vehicles) of the item deliverer servicing a delivery route or worn or carried by the item deliverer (carrier) while servicing the delivery route. The data may include global positioning system (GPS) data points or breadcrumbs, time information/data, health related information/data, and/or travel related information/data. The embodiments described herein may utilize such data to determine actions taken by the item deliverer on the delivery route and aspects or features of the delivery route. In some embodiments, the systems and methods disclosed herein determine one or more activities taken or performed by the item deliverer along the delivery route.

In some embodiments, the systems and methods for route analysis described herein analyze a route as serviced and/or traveled on one day based on data from a piece of equipment used by the item deliverer that services that route. In some embodiments, more than one route and/or more than one day can be analyzed. In some embodiments, the analysis occurs every night or every week or at any other selectable interval. The route analysis may provide for evaluation of the item deliverer's route. Information derived from and/or otherwise identified from the route analysis of a particular route as serviced/traveled by the corresponding item deliverer may be used to optimize and improve operations. For example, the information from the route analysis may be used to optimize one or more of the route, the activities of the route deliverer, and so forth. Details regarding core functionality of the route analysis, including details regarding a variety of functions and algorithms, are described below.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" or "item deliverer" may refer to an individual assigned to a route who delivers the items to each destination. The term may also refer to other delivery resources, such as trucks, trains, planes, automated handling and/or delivery systems, and other components of the distribution network. The present disclosure also relates to systems and methods to analyze items sent from or received in a geographic area to identify potential information regarding the item that may provide additional revenue streams for the distribution network.

Additionally, as used herein, the term "resident" may refer to any individual or entity that resides, works, visits, or is associated with an address. For example, as used herein, a person at his or her office is a resident, as is a student or teacher at a school. As used herein, a resident can be an entity capable of sending items from an address and receiving items at an address. Additionally, the term "residence" may refer to any building having an assigned physical address, such as a house, an office building, an apartment, a factory, a school, etc. As used herein, a residence can be any location capable of being a destination for items within the distribution network or being a return address for items in the distribution network.

For example, an item delivery service (IDS) such as the United States Postal Service (USPS), may deliver items (for example, mail), such as letters, flats, parcels, packages, etc., according to static or dynamic routes. The United States Postal Service (USPS) will be used in the present disclosure to describe exemplary embodiments, but the present disclosure is not limited thereto. When referencing generically to any delivery service or distribution network the phrase "item delivery service or (IDS)" will be used to indicate such generalities.

In some embodiments, the delivery service(s) may deliver and/or pick up items over a large geographic area that is divided into one or more delivery routes. In some embodiments, the route(s) may be generated based on address information only when reviewing the geographic area. Accordingly, the routes may not account for variances or details that are particular to addresses or delivery points, which terms may be used interchangeably. For example, the route(s) may mistakenly view an apartment building as including only one actual delivery stop or point while, in actuality, each apartment actually has its own delivery stop or point. Alternatively, the initial generated route may not account for traffic occurrences or variances based on times of day. For example, the initial route may not account for speed limits in school zones that fluctuate based on time of day or high density traffic lights that are only active during high traffic periods (for example, rush hour). In distribution services that track efficiencies and/or grade carrier service based on how well the carrier's movements for the day track their corresponding routes, such "mistakes" or traffic occurrences can affect the carrier's efficiencies or grade because the route to which the carrier's movements are compared is incorrect. Accordingly, systems and methods configured to dynamically augment existing and/or create new routes based on information from the carrier's movements are desired.

The USPS delivers items, such as mail and packages, to every physical address in the United States on a daily basis, Monday through Saturday. The USPS is tasked with providing secure, reliable, and affordable delivery of items to every address in the United States, U.S. territories, and U.S. military installations worldwide. For example, the USPS delivers more than 528 million items to over 152 million destinations (addresses) every day. In delivering these items to each of these addresses, in the United States and worldwide, the USPS may establish numerous routes for carriers to travel when distributing the mail.

FIG. 1 is an overview diagram of a geographic region 105 in which a localized delivery system (not shown) is implemented. The delivery system may comprise or utilize an automated system, a software interface, or a live attendant, for example. The delivery system includes or utilizes a delivery resource 110 traveling across the geographic region 105. As shown in FIG. 1, the delivery resource 110 represents a delivery vehicle. Alternatively, the delivery resource 110 represents an item deliverer, and so forth. At any particular time, the delivery resource 110 may be located along a route 102. One or more other delivery vehicles (not shown) may travel across the geographic region 105 along another route. In some embodiments, the delivery resource 110 may be part of one or more transportation services and may travel according to one or more delivery routes that are static and predetermined or dynamic and variable.

The route 102 may comprise one or more stops 104*a*-104*e* within the geographic region. The delivery resource 110 may travel along the route 102 and stop at the one or more stops 104*a*-104*e* to pick up or drop off one or more items. In some embodiments, the stops are at businesses, residences, or other standalone mailbox locations. Accordingly, the stops may be located in close proximity to each other or with large distances between one or more of the stops. Though the route 102 as shown is generally straight, the route 102 may include any number of turns, stops, etc. In some embodiments, the route may be a static route, meaning the route is fixed and delivers to the same delivery points each day, the delivery points being a subset of all the delivery points in a geographic area.

In some embodiments, one or more of the stops 104*a-e* shown on the route 102 correspond to stops at delivery points. In some embodiments, the stop can be a dynamic or a static stop. The dynamic stop is a stop that is dynamically added or removed from the route 102 while the delivery resource 110 is traveling along the route 102, or which is not one of the delivery points along the static route, or is a static delivery point to which the delivery resource has already delivered, and is dynamically routed back to. For example, while the delivery resource 110 is traveling along the route 102, a customer may contact the delivery network operating in the geographic region 105 to request or coordinate a pickup and/or delivery of an item or good. The stop at which the coordinated pickup or delivery occurs is a dynamic stop. The static stop is a stop that is not added or removed from the route 102 while the delivery resource 110 is travelling along the route 102 but was part of the route 102 when the delivery resource 110 begin traveling the route 102.

The delivery system experiences various costs for use of the delivery resource 110, either via a contract with a third-party or directly through a driver, operator, etc. (for example, the carrier or item deliverer), that is associated with the delivery system (for example, an employee of the delivery system). The delivery system uses the route 102 to estimate the costs of the delivery resource 110 and driver, etc. For example, the delivery system uses the route 102 to estimate an expected amount of time of travel along the route 102 and servicing of the stops 104a-104e and uses this estimated amount of time to then generate the cost for the route 102, which may include a wage for the driver/operator, costs of the delivery resource 110, etc. Accordingly, accurate information regarding the route 102 is essential in estimating an accurate cost for the route 102. Furthermore, while the route 102 accounts for stops at each address along the route, in every day operation, only a subset of the stops may generally be required, and the information regarding the route 102 may account for either the full route 102 (with all stops) or only an average of the subset of stops generally required.

The delivery system may include one or more components that utilize information from the delivery resource 110 to generate and/or update the route 102 along which the delivery resource 110 travels to pick up and distribute items.

The disclosed methods and systems can be used on a local level, such as depicted in FIG. 1, and can be used on a city or town level, a county level, a state level, a regional level, a national level, or with any desired geographic area.

Figure 2A:
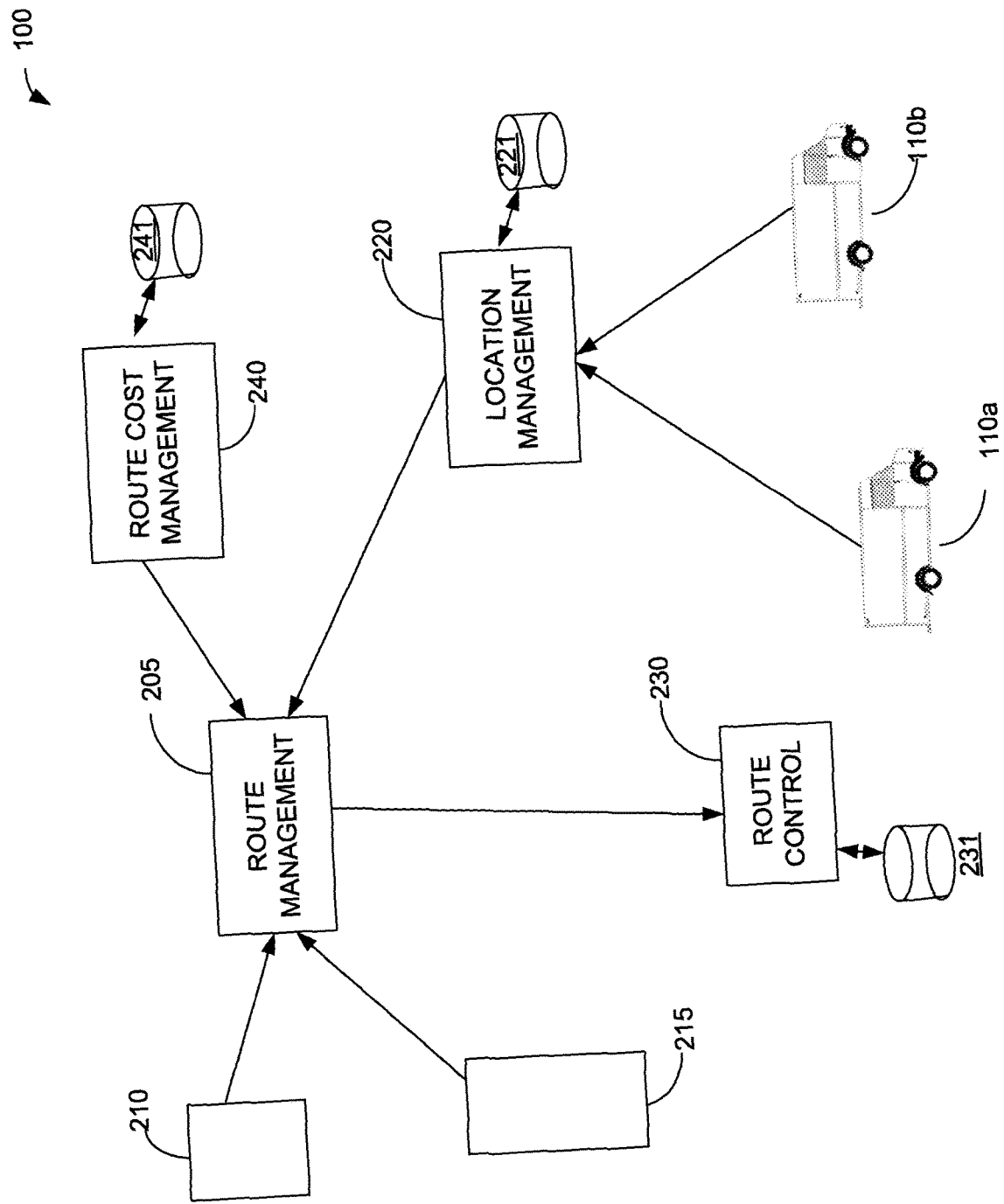
FIG. 2A is an exemplary block diagram of a portion of the delivery system.

FIG. 2A is an exemplary block diagram of a portion of the delivery system 100. The delivery system 100 includes a route management component 205, a location management component 220, a vehicle location database 221, a route control component 230, a vehicle route database 231, a cost management component 240, and a route cost database 241. Each of the route management component 205, the location management component 220, the route control component 230, and the route cost management component 240 comprises one or more of a networked computer system, a server, or similar system configured to receive information from one or more sources, including customers, delivery resources 110, etc., and process the received information electronically. In some aspects, the information received from customers may be received via a computer portal or interface 210, such as a website, an internet-enabled computing device, a software application, a smartphone, or the like. In some aspects, the information received from customers may be received from electronically from a call center 215, with the customer calling into the call center 215 or showing up in person to communicate a request, where the request comprises a change in a route (i.e., an added stop) for one of the delivery resources 110 associated with the delivery system 100.

In some aspects, the route management component 205 comprises a processor or similar data processing component or circuit that receives location information, such as Global Positioning System ("GPS") information and/or time information, from the delivery vehicle(s) 110 via the location management component 220. For example, the delivery resource 110 includes two GPS devices, one of which is considered part of the delivery resource 110 (e.g., the first GPS device) and the other being considered part of the driver or operator (e.g., the second GPS device). In some embodiments, the location management component 220 receives GPS information from the two GPS devices of the delivery vehicle(s) 110 via one or more communication systems. The location management component 220 also preprocesses the received GPS information and appends time information to the received GPS information as needed if the received GPS information does not already include time information. In some embodiments, the location management component 220 may perform one or more of the processes described herein by implementing one or more of the described algorithms. In some embodiments, the location management component 220 may store information (for example, received GPS information, etc.) in a vehicle location database 221.

In some aspects, the route management component 205 uses the GPS information received from the location management 220 (and/or any information determined from an analysis of the GPS information) to receive location information for delivery resources 110 and manage routes 102 of the delivery resources 110. Accordingly, the route management component 205 uses the route control component 230 to create new routes 102 and/or update existing routes. For example, via the route management component 205, the delivery system may track and/or monitors all routes 102 associated with the delivery system and its delivery resources 110. In some embodiments, the various information regarding the routes 102 is stored in a route database 221.

The route cost management component 240 may determine and/or track costs of the routes 102. Costs determined and tracked can include monetary costs, time costs, effects on delivery resources such as carriers, including route difficulty, etc.; effects on vehicle, for example, the number of U-turns, left turns, reversing, speed limits, etc.; elevation, terrain, etc. Cost components of the routes 102 may be used to evaluate the routes, for example, to determine how to adjust them to make them more efficient, safe, and/or cost effective. Details of the route cost may be saved in the cost database 241.

In some embodiments, the delivery system may work to make its routes 102 more efficient. For example, the delivery system may monitor efficiencies of existing routes 102, monitor efficiencies of delivery resources 110 on their routes 102, and determine how to improve existing routes 102, combine existing routes 102, and generate new routes 102, for example, new static routes. In some embodiments, such changes and/or improvements may be made based on an analysis of information regarding the routes 102 and based on GPS information received from delivery resources 110 traveling along their routes.

Details of how the GPS information from the GPS devices of the delivery resource 110 can be used in conjunction with existing routes 102 are described below. As noted above, GPS information (such as GPS readings) may be received from the GPS devices of the delivery resource 110.

In some embodiments, where the delivery resource 110 includes the delivery vehicle, two devices can provide GPS readings, as described above. For example, some hardware integrated into the delivery vehicle may send a first GPS signal, and a mobile delivery device (MDD) having a GPS circuit can send a second GPS signal. In some embodiments, the MDD is worn and/or carried by item deliverer while servicing the route. Both of these devices may independently transmit GPS readings to one of a controller in (or associated with) the delivery resource 110 or the location management component 220. Accordingly, stops may be duplicated if the GPS readings from both of the GPS devices from the same delivery resource 110 are analyzed, especially because, in general, the two GPS devices will not agree precisely with respect to the locations (i.e., the longitude and latitude) of stops nor on the start or end times of the stops.

The systems and methods for analyzing routes may utilize the data received from the MDD or a similar device used by the item deliverer or carrier. The data from the MDD may be collected each day for analysis once the carrier completes the route for that particular day. The data received from the MDD is cleansed and/or filtered before being analyzed. Cleansing and/or filtering the data may comprise removing duplicate GPS points and/or times, validating information in the data, categorizing the raw GPS information into tasks, such as stops or travel, and the like. In some embodiments, the route analysis for a particular route or day may be performed in parallel with the analysis of one or more other routes or days. In some embodiments, cleansing, filtering, and/or validating information may comprise: identifying duplicate GPS points and removing duplicated GPS points, identifying duplicate GPS time stamps and removing duplicated GPS time stamps, identifying unsorted time data and sorting such time data in chronological order, identifying unsorted accelerometer data and sorting such accelerometer data in chronological order, among other actions. In some embodiments, the cleansing, filtering, and/or validating information also comprises identifying one or more error situations, for example that the data received from the MDD includes GPS and/or other data, that the data from the MDD does not include data for more than one day or more than one route or more than one MDD, and/or that the data does not include too little data (for example, less than a full route's worth of data or less than five (5) minutes worth of data). If any of the error situations are detected, then the route analysis may be halted or an error flag or alert may be generated.

In some embodiments, the systems described herein include various components operating in combination. The various components may utilize different information regarding the route data in the analysis. The route data may include a date that the item deliverer serviced or worked the route, an ID for the item deliverer, an ID associated with the MDD of the item deliverer, a ZIP® code in which the route serviced by the item deliverer is located, and an ID associated with the route itself, in addition to the GPS and similar data received from the MDD itself. In some embodiments, the route data includes data from accelerometers, gyroscopes, pedometers, smart watches, mobile communication devices, and so forth. For example, in some embodiments, the MDD, the delivery resource 110, or the item deliverer may carry one or more devices that provide such information, such as an accelerometer, The systems and methods described herein may process the data received from the MDD using various operations and/or algorithms. For example, GPS data received from the MDD may be processed to remove "outliers" from the received GPS data. Outliers may be identified as GPS data points that identify locations that are away from a majority of other GPS points received from the MDD. For example, if the GPS data includes five (5) data points within a 5 meter radius of each other within a 10 second interval and one (1) data point that is 10 meters away from any other GPS data point, then the one data point 10 meters away from the other GPS data points may be determined to be an outlier with respect to the 5 GPS data points.

Outliers may be determined using any known processing, for example centroid filtering and/or moving median filtering. The centroid filtering may be used in conjunction with the moving median filtering and/or separate from the moving median filtering. The centroid filtering may provide for removal of extreme outlier data points from a collection of data points while the moving median filter may be used to remove localized outliers, as described in further detail below.

Figure 2B:
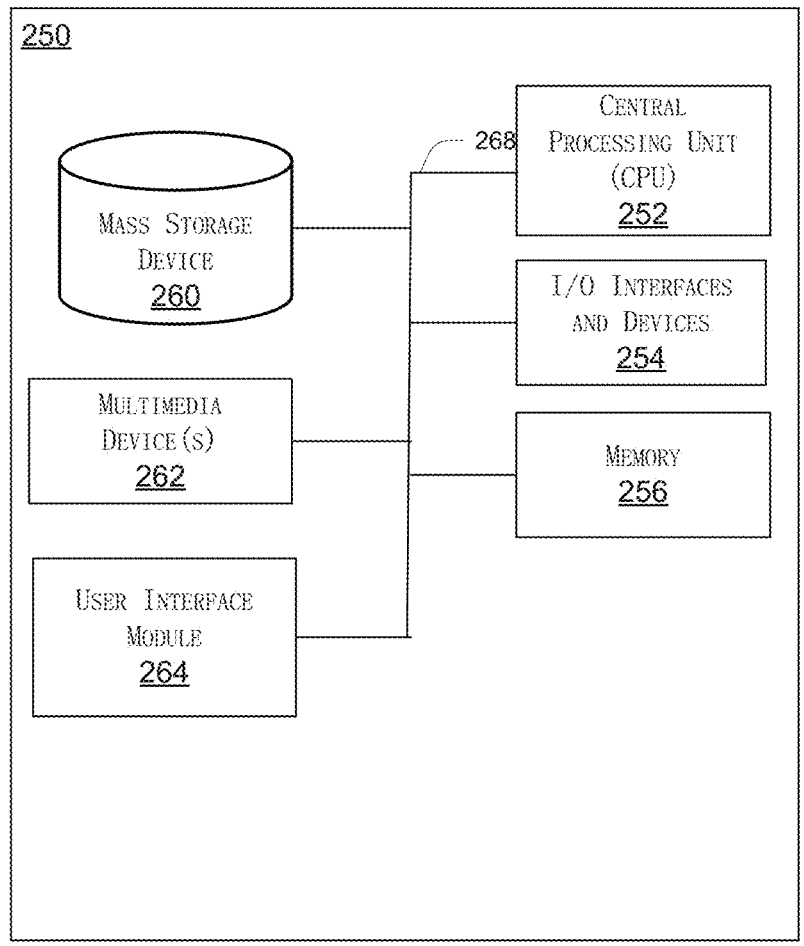
FIG. 2B is a block diagram corresponding to an aspect of a hardware and/or software component of an example embodiment of one of the modules or components of the system of FIGS. 1 and 2A.

FIG. 2B is a block diagram corresponding to an aspect of a hardware and/or software component of an example embodiment of one of the modules or components of the system of FIGS. 1 and 2A. As shown in FIG. 2B, the delivery system 100 (or a component thereof) includes the module or subsystem 250. In some embodiments, any one or more of the route management module 205, the route location management module 220, the route control module 230, and the route cost management 240 may comprise the module or subsystem 250. In some embodiments, the delivery system 100 may comprise a single system embodied by the module or subsystem 250. As such, each of the route management module 205, the route location management module 220, the route control module 230, and the route cost management module 240 may be modules, instances, and/or software that operate on the module or subsystem 250. In some embodiments, the module or subsystem 250 (and any of the modules of the system 100) may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2B, one or more of route management module 205, the route location management module 220, the route control module 230, and the route cost management module 240 may be modules, instances, and/or software that operate on the module or subsystem 250. This, and other modules in delivery system 100, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. These components may be used to implement systems and methods described herein.

In some embodiments, certain modules described herein, such as the route management module 205, the route control module 230, the computer portal or interface 210, the location management module 220, and the route cost management module 240 of the delivery system 100 may be included with, performed by, or distributed among different and/or multiple devices of the delivery system 100. For example, certain user interface functionality described herein may be performed by the user interface module 214 of the module or subsystem 250 and/or by computer portal or interface 210 of FIG. 2A.

In some embodiments, the various modules described herein may be implemented by either hardware or software. In an embodiment, various software modules included in the delivery system 100 may be stored on a component of the delivery system 100 itself, or on computer readable storage media or other component separate from the delivery system 100 and in communication with the delivery system 100 via a network or other appropriate means.

The module or subsystem 250 (or any components or modules of the delivery system 100) may comprise, for example, a computer that is IBM, Macintosh, or Linux/Unix compatible or a server or workstation. In some embodiments, the subsystem 250 comprises a smart phone, a personal digital assistant, a kiosk, or a media player. In some embodiments, the subsystem 250 may comprise more than one of these devices. In some embodiments, the subsystem 250 includes one or more central processing units ("CPUs" or processors) 252, I/O interfaces and devices 254, memory 256, a mass storage device 260, multimedia devices 262, the user interface module 264, and a bus 268.

The CPU 252 may control operation of the subsystem 250. The CPU 252 may also be referred to as a processor. The processor 252 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The I/O interface 254 comprises a keypad, a microphone, a touchpad, a speaker, and/or a display, or any other commonly available input/output (I/O) devices and interfaces. The I/O interface 254 may include any element or component that conveys information to a consumer or user of subsystem 250 or the delivery system 100 and/or receives input from the consumer or user. In one embodiment, the I/O interface 254 includes one or more display devices, such as a monitor, that allows the visual presentation of data to the consumer. More particularly, the display device provides for the presentation of GUIs, application software data, websites, web apps, and multimedia presentations, for example.

In some embodiments, the I/O interface 254 may provide a communication interface to various external devices. For example, subsystem 250 is electronically coupled to the network, which comprises one or more of a LAN, WAN, and/or the Internet. Accordingly, the I/O interface 254 includes an interface allowing for communication with the network, for example, via a wired communication port, a wireless communication port, or combination thereof. The network may allow various computing devices and/or other electronic devices to communicate with each other via wired or wireless communication links.

The memory 256, which includes one or both of read-only memory (ROM) and random access memory (RAM), may provide instructions and data to the processor 252. For example, inputs received by one or more components of the subsystem 250 may be stored in the memory 256. A portion of the memory 256 may also include non-volatile random access memory (NVRAM). The processor 252 typically performs logical and arithmetic operations based on program instructions stored within the memory 256. The instructions in the memory 256 may be executable to implement the methods described herein. In some embodiments, the memory 256 may be configured as a database and may store information that is received via the user interface module 264 or the I/O interfaces and devices 254.

The system 100 or subsystem 250 may also include the mass storage device 260 for storing software or information (for example, the vehicle history reports or associated data, historical information, comparison data, etc.). Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. Accordingly, the historical report valuation system 108 may include, e.g., hardware, firmware, and software, or any combination therein. The mass storage device 260 may comprise a hard drive, diskette, solid state drive, or optical media storage device.

The subsystem 250 or delivery system 100 also includes the user interface module 264. In some embodiments, the user interface module 264 may also be stored in the mass storage device 260 as executable software code that is executed by the processor 252. In the embodiment shown in FIG. 2B, the subsystem 250 may be configured to execute the user interface module 264 to perform the various methods and/or processes as described herein.

The user interface module 264 may be configured to generate and/or operate user interfaces of various types. In some embodiments, the user interface module 264 constructs pages, applications ("apps") or displays to be displayed in a web browser or computer/mobile application. In some embodiments, the user interface module 264 may provide an application or similar module for download and operation. The pages or displays may, in some embodiments, be specific to a type of device, such as a mobile device or a desktop web browser, to maximize usability for the particular device. In some embodiments, the user interface module 264 may also interact with a client-side application, such as a mobile phone application (an "app"), a standalone desktop application, or user communication accounts (e.g., e-mail, SMS messaging, etc.) and provide data as necessary to display vehicle equity and prequalification determinations. For example, as described herein, the subsystem 250 may be accessible via a website.

In some embodiments, the communications with the delivery system 100 or the subsystem 250 may be specially formatted to be simultaneously communicated via multiple communications methods and/or formats (e.g., text, e-mail, call, mail, etc.).

The bus 268 may electrically and/or physically connect the components of the subsystem 250 to enable communication between the components.

Figure 3:
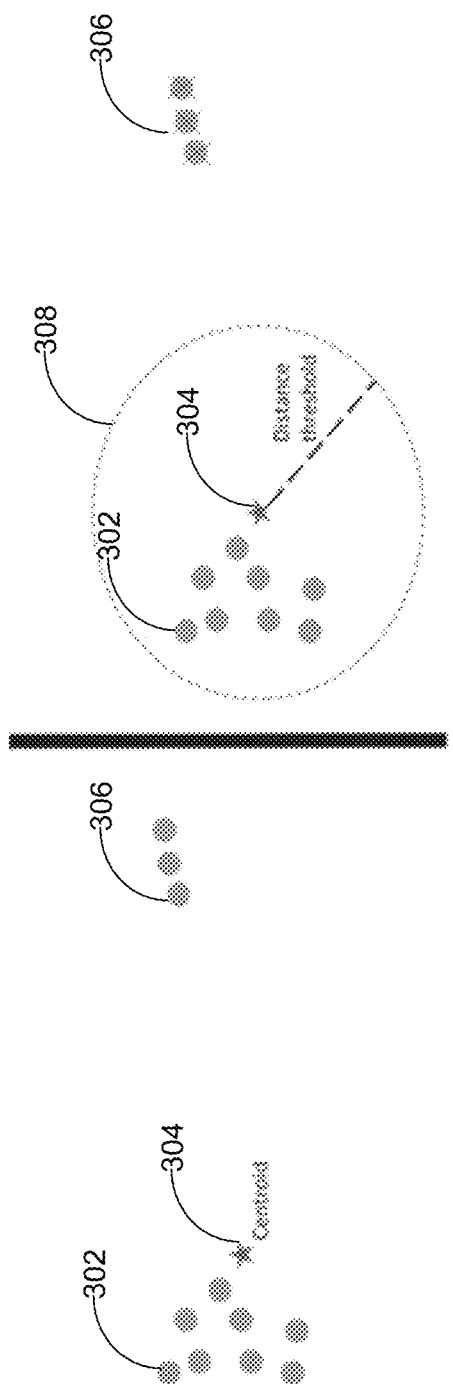
FIG. 3 shows an example of geographic clustering of data points, including a first cluster of 8 data points (for example, GPS data points), an indicator identifying a center point of a centroid, and a second cluster of 3 data points.

An example of centroid filtering is described with reference to FIG. 3, which shows a first cluster 302 of 8 data points (for example, GPS data points), an indicator 304 identifying a center point of a centroid 308, and a second cluster 306 of 3 data points. In some embodiments, the centroid filtering may be performed by the CPU 252, for example of the route management module 205 or of the system 100 itself. The centroid 308 is drawn having a predetermined or selectable distance threshold such that the centroid 308 is generated around the indicator 304. In some embodiments, the centroid 308 is a circle or other circular geometric shape. Alternatively, or additionally, any other shape may be used to determine an area of accepted or acceptable data points.

Centroid filtering works on the assumption that most of the data points (for example, the GPS data points) are correctly located around a route and that outliers are a minority in the data set. In some embodiments, the centroid filtering is calculated by taking the mean latitude and longitude for all of the GPS data points. A distance of each GPS data point from the centroid indicator 304 is calculated and any data exceeding the threshold distance, for example 10 miles, 100 feet, 50 feet, 10 feet, or any other distance, is removed from the first cluster 302 as shown in FIG. 3.

Based on the distance threshold, the centroid 308 is drawn and all data points that fall within the centroid 308 are part of the first cluster 302 while all data points that fall outside the centroid 308 are part of the second cluster 306. According to the centroid filtering, the 8 data points of the first cluster 302 are determined to be valid or acceptable data points while the 3 data points of the second cluster 306 are determined to be invalid or unacceptable data points.

The subsequent moving median filtering may remove extraneous data points from, for example, within the first cluster 302. The data points of the first cluster 302 are analyzed using a moving median filter to remove any extraneous GPS points within the first cluster 302. The moving median filtering may be conducted based on one or more of latitude, longitude, and time, individually. The moving median filtering works by sliding a window of size N data points of the first cluster 302 and calculates a median value of that subset of N data points. The median value may comprise the median latitude, longitude, and/or time, based on which parameter the moving median filtering is performed based on. The data points contained in the window are then replaced with the median value. The window then continues to "slide" across the remaining data points of the first cluster 302 from beginning to end of the first cluster 302 of data points, as shown in FIG. 4.

Figure 4:
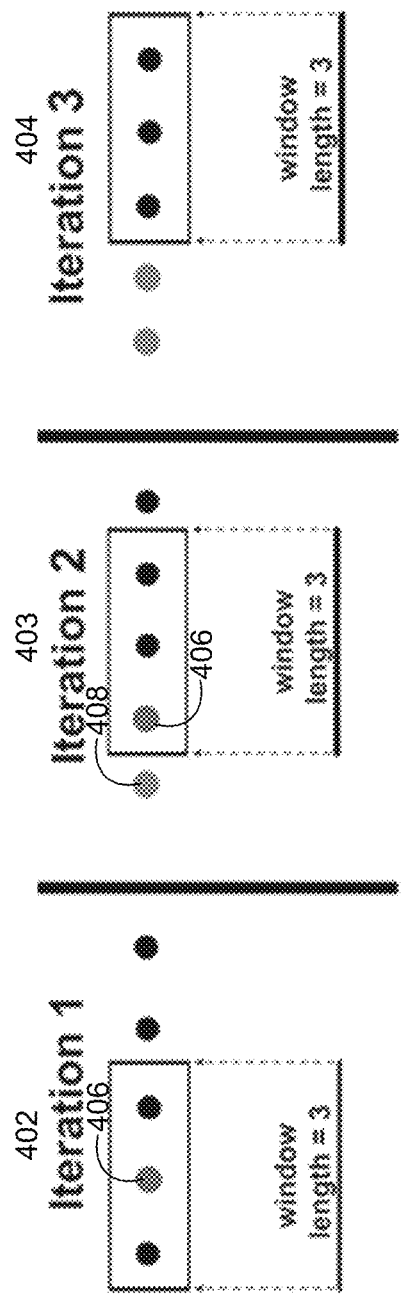
FIG. 4 shows three iterations of the sliding window based on the data points of the first cluster.

FIG. 4 shows three iterations of the sliding window based on the data points of the first cluster 302. The first iteration 402 includes a first window that encompasses three data points of the first cluster 302. In the first iteration 402, the first window comprises three data points. The second data point 406 signifies an erroneous data point, while the remaining data points of the first iteration 402 are data points that are to be filtered using the moving media filtering. The second iteration 403 includes a second window comprising three data points. The data points in the second window include the data point 406. The second iteration 403 also includes one data point that has been processed by the moving median filtering. For example, the data point 408 is an example of the data point that is replaced by the median value. The third iteration 404 shows the third window after two data points 408 are generated from the processing of the moving median filtering.

After the moving median filtering is performed, another outlier rejection algorithm may be used. For example, the other outlier rejection algorithm may reject data points that correspond to data points that exceed a second threshold, for example those data points that indicate movement of more than 40 meters in a single time step (for example, one second). This filtering may help reduce the effect of scatter on the remaining data points.

After the data is cleansed, filtered, and/or validated as performed, for example, by the CPU 252 of the route management module 205 or of the system 100 itself, the data received from the MDD (or other device) may be analyzed to derive one or more values. For example, GPS data points from the MDD can be used to determine one or more of a direction or distance of travel (for example, a distance traveled east or north), an distance of elevation change, a speed in a particular direction, an acceleration in a particular direction, a horizontal and/or vertical speed, and a total distance traveled. In some embodiments, this information (or similar information) is determined or derived based on a geo-origin plane centered at the median of the GPS data points (for example, latitude and longitude) and fixed to the earth's surface.

Further analysis of the data by the CPU 252 may include determination of gaps in data, for example gaps in GPS data received from the MDD. Data gaps may be caused by the MDD losing communication with one of a controller in the delivery resource 110 or the location management component 220 or being turned off, and so forth. For example, if a calculated speed between two GPS data points is greater than 44.7 meters per second (m/s) (~100 miles per hour (mph)), then a gap may exist between the two GPS data points. Start and end times of each gap may be recorded and used for state determination, as described in further detail below. The speed of 44.7 m/s is exemplary only. In some embodiments, the gaps are determined by checking the distance between the two or more GPS points and calculating the speed between the two or more GPS points. Since the GPS points are received every second, the CPU 252 checks to see if there is a segment between any two GPS points that has a corresponding speed of above 100 mph. If such a segment exists, then that segment will be marked as a gap.

After the data is analyzed as described herein, one or more components of the system 100 (for example, the route management component 205) may determine a confidence factor. The confidence factor may apply to each GPS data point received from the MDD or for all GPS data received for a given day along a given route. In some embodiments, the confidence factor indicates a quality of GPS data received from the MDD. The confidence factor may fall with a confidence range of between 0% and 100%, with 0% being the least confident GPS data and 100% being the most confident GPS data. Depending on the confidence factor, the route analysis (for example, as performed by the route management component 205) may use different methods to analyze the route.

Various factors may impact confidence levels of the GPS data, and those factors may result in different methods for analyzing the route. For example, memory issues cause by the analysis of route data may result in different methods being used to analyze the routes is different conditions. Routes having GPS data that is inaccurate, for example by more than 1 hour, may trigger memory issues during the route analysis. Similarly, GPS scatter that exceeds a threshold can cause memory issues during clustering. GPS scatter may span large distances (for example, 100s of meters) while GPS routes with low scatter have GPS data points that are evenly distributed across the route.

Figure 5:
FIG. 5 shows an example of a map in which a significant amount of GPS scatter exists over a period of 1.2 hours, as identified in GPS data received from an MDD along a route.

FIG. 5 shows an example of a map 500 in which a significant amount of GPS scatter exists over a period of 1.2 hours, as identified in GPS data received from an MDD along a route 506. In some embodiments, such examples of GPS scatter are identified using one or more algorithms for analyzing data, for example Density Based Spatial Clustering of Applications with Noise ("DBSCAN"). However, DBSCAN may prove to be memory and/or resource intensive in route analysis of routes having such amounts of GPS scatter. In some embodiments, Geohashing may be an alternative to DBSCAN. Geohashing may discretize a surface of the Earth and "bin" the GPS data received from the MDD. A bin may correspond to a particular geographic region or area. The bins that have the greatest volume or number of data points within them may be indicative of areas of GPS scatter.

Figure 6A:
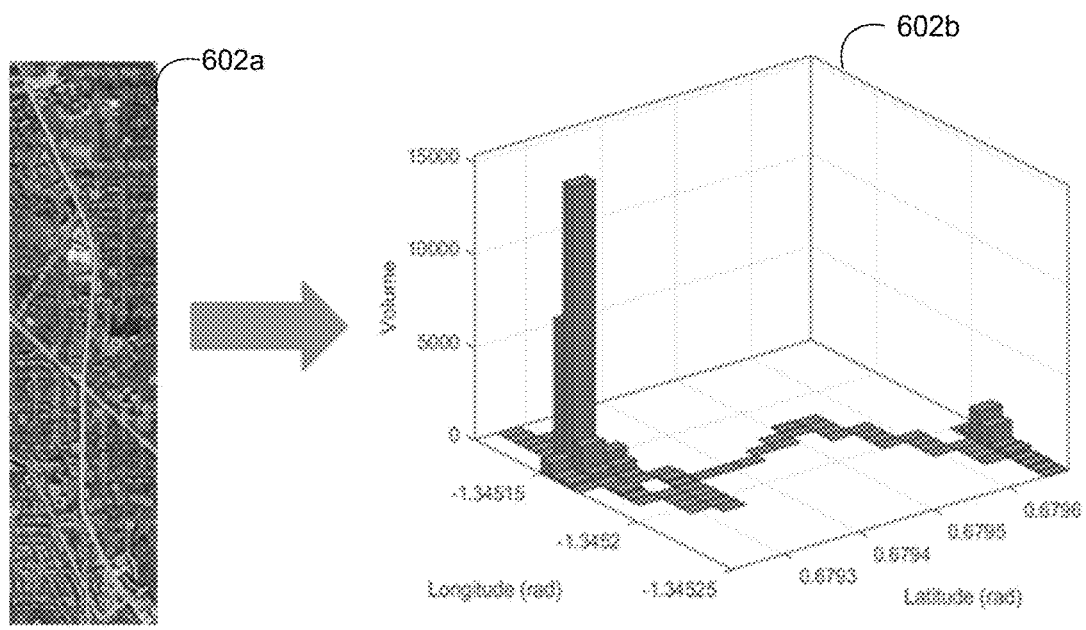
FIGS. 6A and 6B include a correlation between data points and GPS scatter based on two routes along two map sections.
Figure 6B:
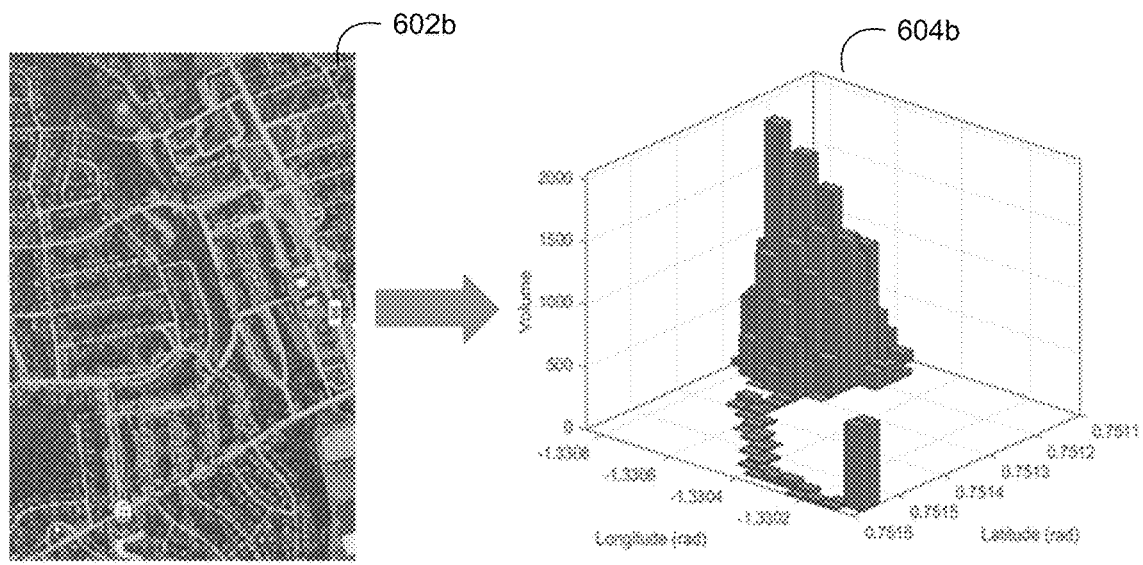

For example, FIGS. 6A and 6B include two routes along two map sections 602a and 602b. High volumes of GPS data points at different portions of the graphs 604a and 604b (corresponding to the routes shown on the maps 602a and 602b) indicate that GPS scatter exists in the northwestern and southeastern parts of the routes being analyzed in the maps. The volume of GPS data points that exist in these two sections of GPS scatter may be approximately 15000 GPS data points. As shown in both FIGS. 6A and 6B, for the portions of the route that fall between the northwestern and southeastern sections having the high level of GPS scattering, minimal GPS scatter exists and/or the GPS scattering is normally distributed, thereby creating bins (using the geohashing method of analysis) that have similar volumes of GPS data points as each other.

In some embodiments, an example of an algorithm for determining a confidence factor for the route being analyzed involves first determining which GPS data points from the MDD are GPS data points accumulated while the item deliverer is walking versus while in the delivery resource 110. In some embodiments, this may comprise analyzing data from an accelerometer or similar device. For GPS data points that are classified as relating to movement of the delivery resource 110 (for example, while driving), the GPS data points are placed into discrete bins using geohashing. Once all GPS data points are placed into the discrete bins, the volume for each of the bins is determined and summed. Based on the sum of all of the volumes of the bins, Equation 1 below determines the confidence factor of the route:

$$ConfFactor = \left(1 - \left(\frac{x}{Total\#Samples}\right)^2\right) * 100 \qquad \text{Equation 1}$$

Where:
ConfFactor is the confidence factor for the route;
x is the sum of all the volumes of the bins
and Total#Samples is the number of GPS data points of the route.

Equation 1 may result in higher confidence values for routes that are evenly distributed as compared to routes that include one or more areas of GPS scattering, which may generally have lower confidence values. In some embodiments, if the confidence factor is less than a threshold value (for example, 95%), then a flag is set to avoid processing GPS data points that form the GPS scattering.

The route analysis performed by the systems and according to the methods described herein may identify when erroneous GPS data points are received. In some embodiments, erroneous GPS data points may comprise GPS data points that show different locations even though the MDD and/or the delivery resource 110 is stationary. For example, GPS data points may provide accurate location information within +/−5 meters. Thus, when the MDD is stationary, the GPS data points received may still vary by up to 10 meters. Thus, when the item deliverer, and thus the MDD, is stopped for a period of time, the GPS data points may still indicate movement. As such, the GPS data points falling within the period of time associated with when the item deliverer was stationary may appear as a cluster of GPS data points. DBSCAN, or a similar clustering algorithm, may be used to identify such instances of erroneous GPS data points being received. When the erroneous GPS data points are identified, corresponding clusters are also determined and identified as a stop along the route being analyzed. For each unique cluster or stop, a mean location is determined based on the location information from the GPS data points clustered into the stop. The individual locations of the clustered GPS data points are updated to the mean location, resulting in improvements in visually depicting the GPS data points.

Figure 7:
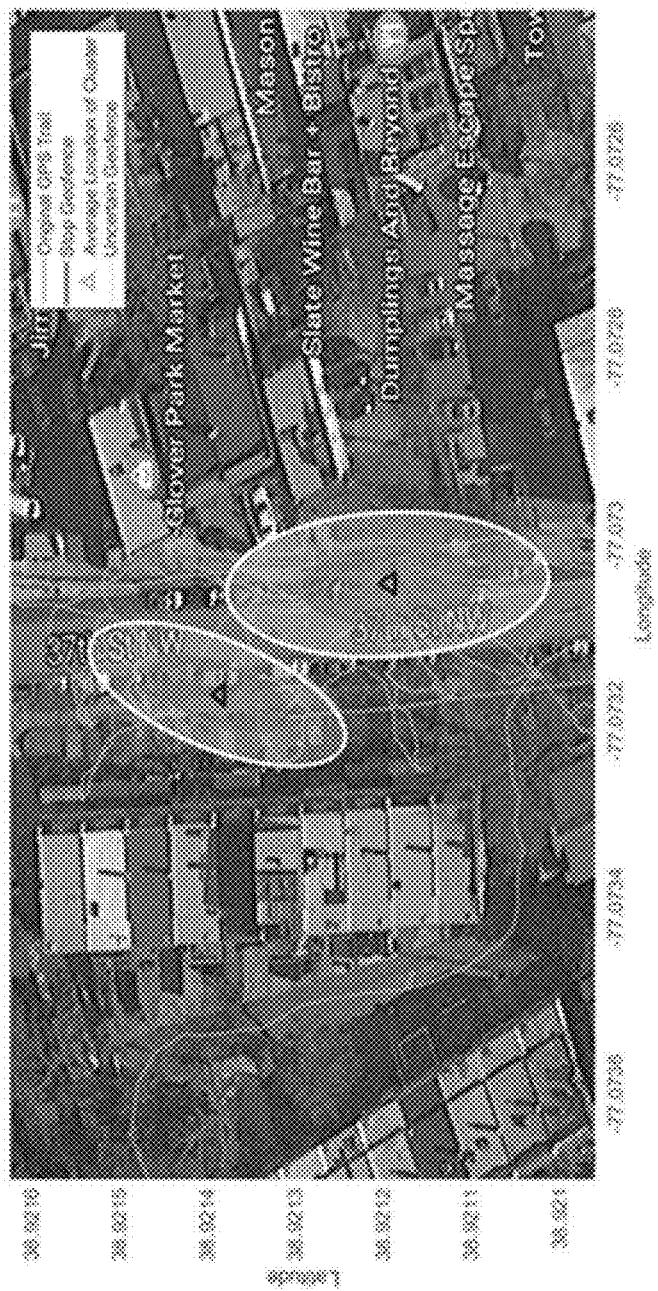
FIG. 7 includes two areas of uncertain geofencing that surround areas of GPS scattering.

As noted above, when the route analysis determines that the confidence value or factor for the route is less than the threshold value, then an uncertain flag associated with the route is set. When the uncertain flag is set, routes or portions of routes having areas prone to or suspected of including GPS scatter are not processed by the DBSCAN or similar algorithm. Since DBSCAN or another algorithm identifies and averages GPS scattering, areas surrounding those having the uncertain flag set may also be prone to GPS scattering. For example, FIG. 7 includes two areas 702a and 702b of uncertain geofencing that surround areas of GPS scattering 704a and 704b, respectively. At or near a center of the areas of GPS scattering 704a and 704b, respectively, are locations to which all GPS data points within the GPS scattering areas 704a and 704b are averaged. The GPS data points within the areas of uncertain geofencing 702a and 702b but outside the areas of GPS scattering 704a and 704b may be marked as uncertain. For any GPS data that is determined to be uncertain, safety and/or street exceptions are not flagged.

Figure 8:
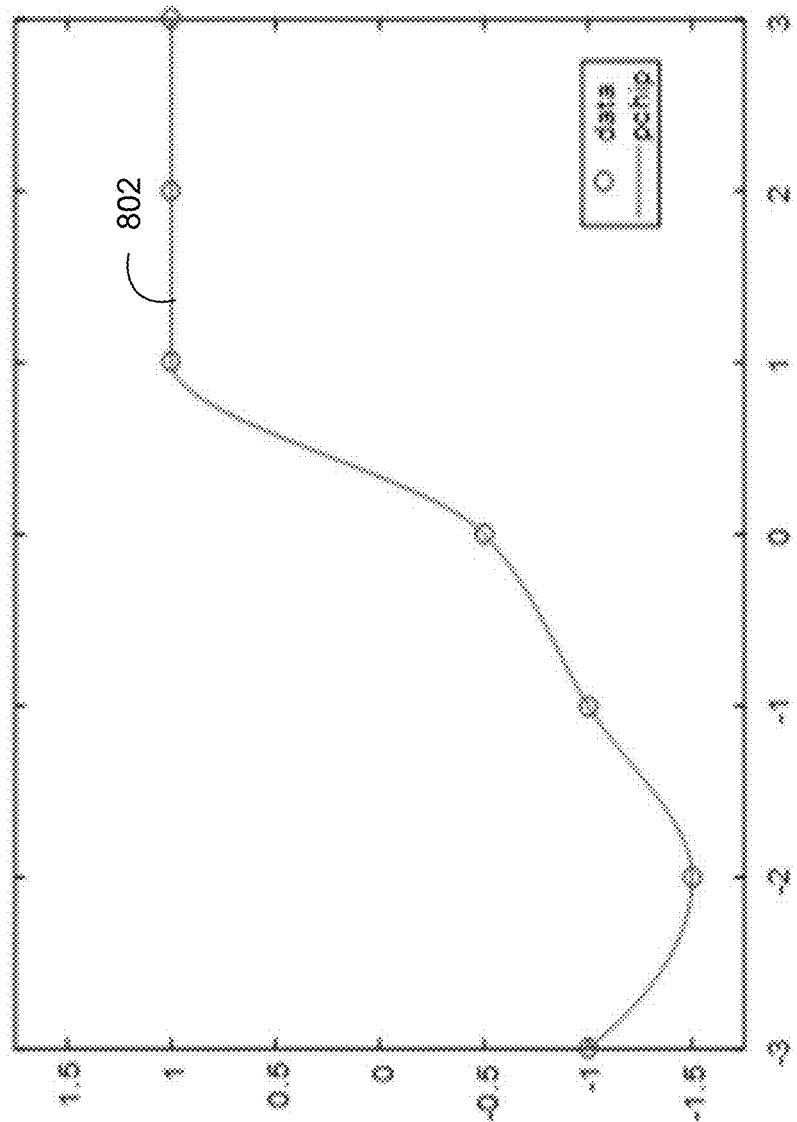
FIG. 8 shows a graph of piecewise cubic hermite interpolating polynomial (PCHIP) to valid GPS data points at a particular frequency.

In some embodiments, after the GPS data points are filtered and initially analyzed, the system 100, for example the route management component 205, resamples and interpolates the GPS data points of the route being analyzed to ensure that the information related to each of the GPS data points is accurate. For example, time gaps between the different GPS data points are compared. If the route management component 205 determines that any GPS data points are more than a threshold number of seconds from a preceding GPS data point, that GPS data point becomes invalid. For example, if a current GPS data point is determined to be received more than 3 seconds after the preceding GPS data point, than the current GPS data point is determined to be invalid. After any invalid GPS data points are determined, the system 100 fits a piecewise cubic hermite interpolating polynomial (PCHIP) to the remaining (for example, valid) GPS data points at a particular frequency. For example, the frequency at which the PCHIP is fit is 10 hertz. An example of resampled and interpolated GPS data points is shown in FIG. 8, where the line 802 corresponds to the PCHIP and the points 704 represent the GPS data points.

In some embodiments, the system 100, for example, the route management module 205, analyzes the GPS data points from a particular route to determine a particular state for the item deliverer servicing the particular route. For example, the system 100 may determine when the item deliverer is walking along the route or traveling in the delivery resource 110. In some embodiments, the system 100 may receive information from the MDD that indicates movement in addition to the GPS data points. For example, as introduced above, the system 100, for example the route management module 205, may receive information from the accelerometer and/or the gyroscope. In some embodiments, as described above, the accelerometer and/or the gyroscope may also be part of the MDD. As such, the accelerometer and/or the gyroscope may indicate movements of the item deliverer when the MDD is worn on the item deliverer.

Figure 9:
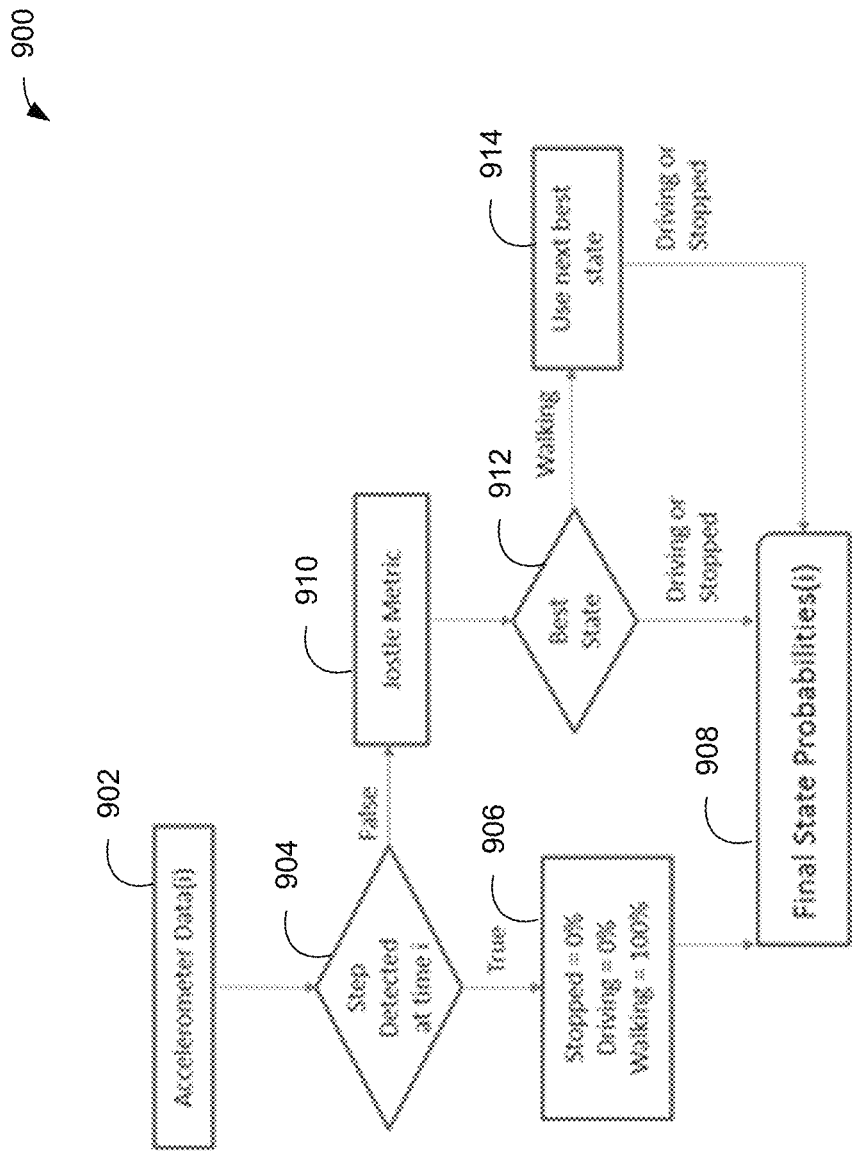
FIG. 9 shows a flowchart of determining a state of the item deliverer when not walking.

Based on the information from the MDD, the system 100 may apply a step detection algorithm to determine when the item deliverer is walking or not walking. When the item deliverer is determined to not be walking, the step detection algorithm may determine when the item deliverer in the delivery resource 110 can be determined to be driving or stopped. FIG. 9 shows a flowchart 900 of determining a state of the item deliverer or carrier. The flowchart 900 indicates a plurality of steps and decision blocks that the step detection algorithm performs. The flowchart 900 begins at block 902, where accelerometer or similar data is received by the system 100. At block 904, the system 100 determines whether a step occurs at a time corresponding to the received data. In some embodiments, the step detection or similar algorithm determines when the item deliverer is walking or not walking by identifying steps taken by the item delivery or other movement of the item deliverer that is not within the delivery resources 110. In some embodiments, the step detection algorithm uses inputs from the accelerometer, the GPS data points, and/or other information from the MDD to determine when the item deliverer is walking. For example, the data from the accelerometer indicates jostling or other movement associated with the item deliverer taking steps. Similarly, certain changes in direction or GPS location data points may indicate when the item deliverer is traveling on foot as opposed to in the delivery vehicle 110. For example, when GPS data points indicate that the item deliverer is off the road for a number of data points but still moving, this indicates the item deliverer is walking (for example, on sidewalks or across lawns, and so forth). If a step is determined to be detected at the time corresponding to the received data, the process 900 proceeds to block 906, where the received data is determined to indicate that the item deliverer is walking at the time associated with the received data. If the item deliverer is determined to be walking at block 906, then the final state for the item deliverer is "walking" or something similar at block 908.

If the system 100 determines at block 904 that a step does not occur at the time associated with the received data, then the process 900 advances to block 910, where the received data is further analyzed to determine whether the delivery resource 110 is driving or stopped. For example, at block 910 the system 100 may determine a jostle metric. Based on the jostle metric, the system 100 may determine a best state for the item deliverer at block 912. If the system 100 determines that the item deliverer is driving or stopped, the process 900 proceeds to block 908. If the system 100 determines that the item deliverer is walking, the process 900 proceeds to block 914, at which a next best state is used, which indicates that the item deliver is driving or stopped, at which point the process proceeds to block 908, where a probability of the final state of the item deliverer is determined as being walking, driving, or stopped. Further details of one or more blocks of the process 900 are provided below.

In some embodiments, the step detection performed at block 906 may be performed using information received from the MDD or another data capture device associated with the item deliverer and the system 100. For example, the MDD may include the accelerometer and the data from the accelerometer may be used for step detection of the item deliverer. For example, the system 100 can determine a step taken by the item deliverer based on the acceleration of the MDD (or similar device) in the direction of gravity, regardless of device orientation.

The raw accelerometer data may be filtered through a 0 Hz low-pass filter to isolate the constant gravity component, $a_g(t)$. By subtracting $a_g(t)$ from the raw accelerometer data $a(t)$, the user's acceleration, $a_u(t)$, can be obtained. Thus, acceleration in each axis x-, y-, and z- is obtained according to Equation 2.1-2.3 below:

$$a_{u,x}(t)=a_x(t)-a_{g,x}(t)$$

$$a_{u,y}(t)=a_y(t)-a_{g,y}(t)$$

$$a_{u,z}(t)=a_z(t)-a_{g,z}(t) \quad \text{Equations 2.1-2.3}$$

Once the acceleration components are determined, a dot product of the user and gravity components $a_g(t)$ and $a_u(t)$ is take to obtain a projection of $a_u(t)$ in the direction of $a_g(t)$. This dot product corresponds to the acceleration of the device providing the raw accelerometer data (for example, the MDD) in the direction of gravity, according to Equation 3.

$$a_{proj}(t)=a_u(t)\cdot a_g(t) \quad \text{Equation 3}$$

Once the acceleration of the device in the direction of gravity is known, more filtering is applied to the raw acceleration data to attenuate high-frequency noise as well as the low-frequency motion unassociated with steps by the item deliverer. In some embodiments, a bandpass filter may be used to cutoff frequencies below 1 Hz and above 19/6 Hz. Thus, the range between, and including, 1 Hz and 19/6 Hz corresponds to the range within which steps by the item deliverer will be counted. Thus, the 1 Hz and 19/6 Hz values may correspond to minimum and maximum step frequencies, respectively. In some embodiments, the system 100 counts steps each time a periodic cycle of the filtered acceleration data exceeds a minimum threshold after also crossing a zero level (for example, after a zero crossing).

Figure 10:
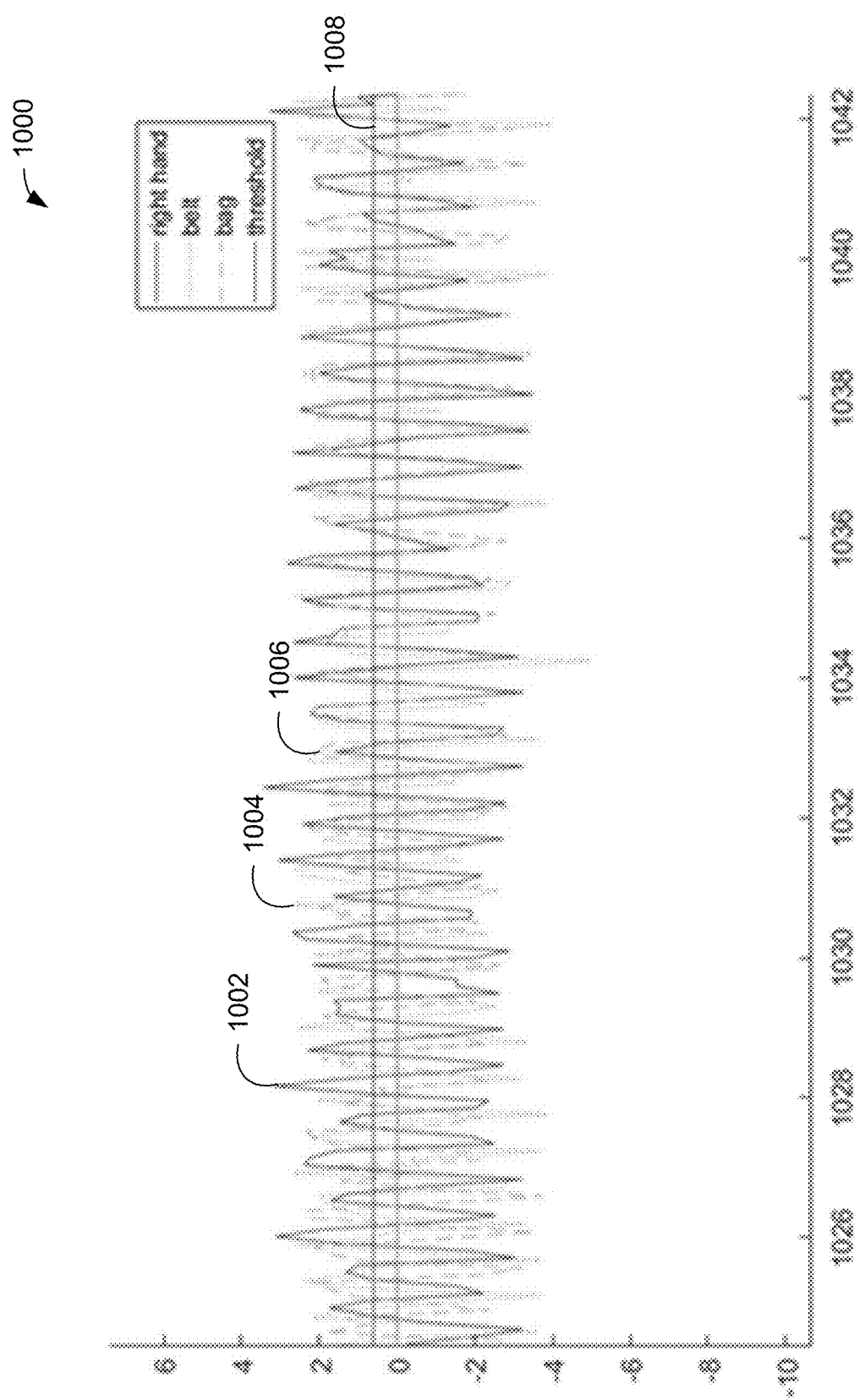
FIG. 10 shows a graph of the filtered acceleration data and how steps can be determined based on the filtered acceleration data, a minimum threshold value, and a zero crossed threshold.

FIG. 10 shows a graph 1000 of the filtered acceleration data and how steps can be determined based on the filtered acceleration data, a minimum threshold value, and a zero crossed threshold. The graph 1000 shows a motion value on the y-axis as a function of time on the x-axis. The graph 1000 includes a line 1002 representing the filtered acceleration data of movement of the item deliverer's right hand, a line 1004 representing the filtered acceleration data of movement of the item deliverer's belt, a line 1006 representing the filtered acceleration data of the item deliverer's bag, and a line 1008 representing the movement threshold.

In some embodiments, differences in the body types of the item deliverers may lead to a variability in gait characteristics of the item deliverers that result in inconsistencies in the step detection. For example, the threshold (for example, the minimum threshold described above) may become unsuitable for item deliverers whose walking acceleration magnitudes vary as compared to the average from which the minimum threshold is determined. Accordingly, algorithms for adaptively identifying the step threshold may apply a Root Mean Square (RMS) peak envelope of an acceleration time series. Thus, the algorithm generates a dynamic step threshold (DST) by taking a square root mean over time of the peaks of the filtered acceleration data. The algorithm results in a smoothed measure of the acceleration peak over time. The system 100 applies a fractional, multiplicative DST factor $\alpha$ to these peaks to yield the dynamic step threshold. In order to filter out long stops or drive durations, a minimum step threshold value is set in which all steps are rejected. The computed DST follows as a function of the RMS envelope, such that Equation 4 provides:

$$DST(t) = \begin{cases} \alpha*env(t), & \alpha*env(t) \geq DST_{min} \\ \infty, & \alpha*env(t) < DST_{min} \end{cases} \quad \text{Equation 5}$$

Where:
α is the DST factor, a value between 0 and 1,
env(t) is the value of the RMS peak envelope for given time t,
$DST_{min}$ is a set minimum threshold value,
When the DST is set to positive infinity, no steps will be registered because the minimum step threshold of infinity precludes any peak crossings.

Figure 11:
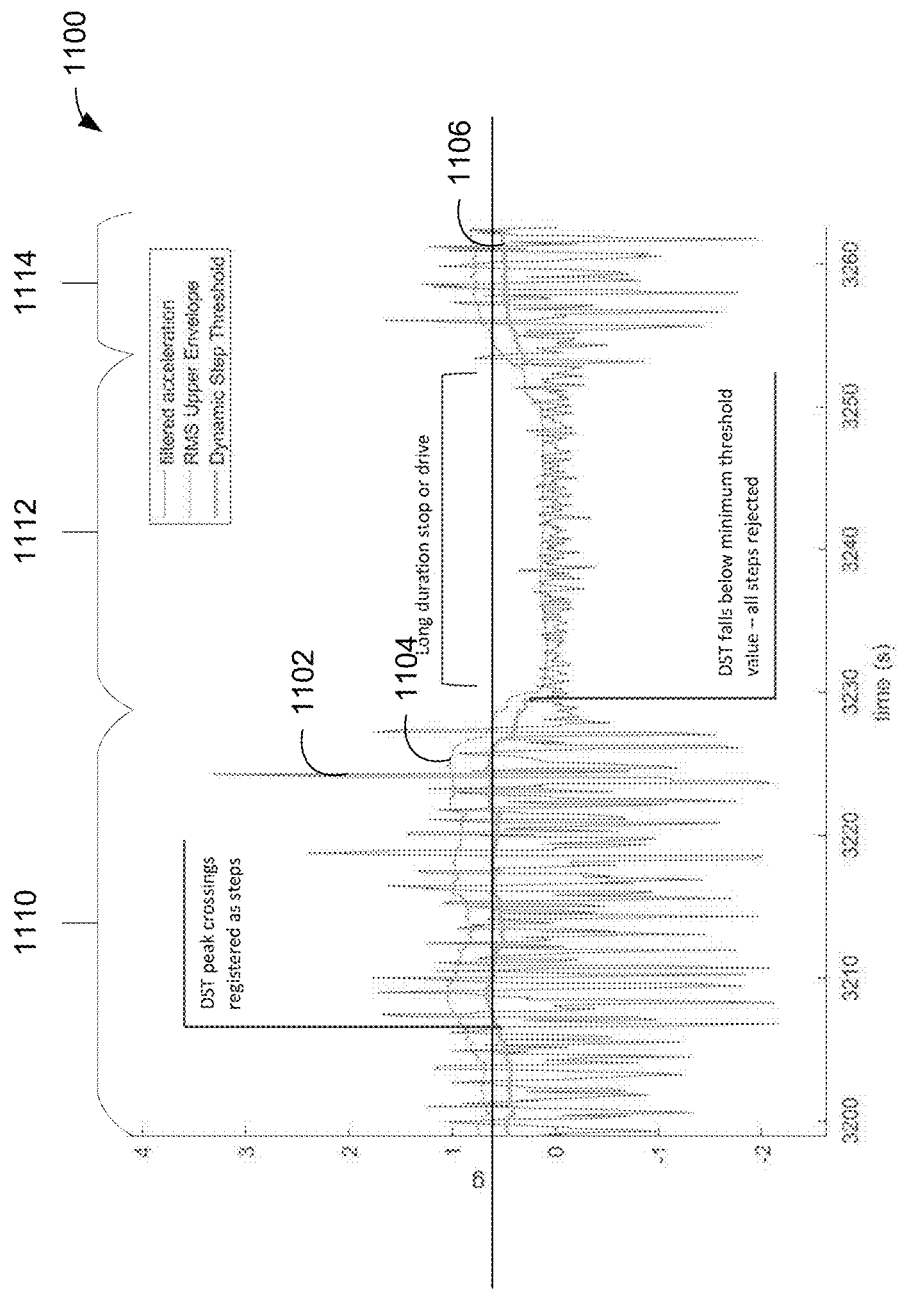
FIG. 11 shows a graph of the filtered acceleration data and how steps can be determined based on the DST and the filtered acceleration data.

FIG. 11 shows a graph 1100 of the filtered acceleration data and how steps can be determined based on the DST and the filtered acceleration data. The graph 1100 shows a motion value on the y-axis as a function of time (s) on the x-axis. The graph 1100 includes a line 1102 representing the filtered acceleration data, a line 1104 representing the RMS upper envelope, and a line 1106 representing the dynamic step threshold. As shown in the graph 1100, for a first region 1110, the item deliverer appears to be walking (as indicated by the variance in the filtered acceleration data). For a second region 1112, the item deliverer appears to be driving (as indicated by the lack of variance in the filtered acceleration data). For a third region 1114, the item deliverer appears to be walking again. Thus, in the second region 1112, the DST falls below the minimum value and all steps are excluded (because there are no actual steps). However, during the first and third regions, when the RMS envelope exceeds the DST, then steps are counted. In some embodiments, the system 100 applies a machine learning optimization heuristic or similar algorithm to compute the DST factor α based on a pool of available connected truth data. The truth data is used to help determine the safety and street exceptions results. For example, truth data (and corresponding metrics) may be determined by performed all safety exceptions (for example, left turns, U-turn, reverse, etc.) and identifying corresponding data from sensors, etc., associated with the safety exceptions.

In some embodiments, the system 100 determines the jostle metric in block 910 based on sensor measurements. For example, the system 100 may use sensor measurements from the 3-axis accelerometer sensor or a similar sensor that is part of the MDD or carried by the item deliverer, and so forth. In some embodiments, while the item deliverer is walking, the accelerometer may move in all three axes. Thus, a volume within which the accelerometer moves while the item deliverer is walking (for example, bounded by a tetrahedron subtended by four equally spaced magnitude measurements) should be larger than when the item deliverer is not walking.

For example, a[1], . . . , a[n] are the most recent n accelerometer measurements and each a[i] corresponds to a three-element vector representing the measured acceleration in each of the three axes, in units of [g], where g is 9.8 m/s. The volume within which the accelerometer movies is computed according to Equation 6 below:

$$V = \frac{|(w-z) \cdot ((x-z) \times (y-z))|}{6} \quad \text{Equation 6}$$

Where:
z=a[n]
y=a[n−4]
x=a[n−8]
w=a[n−12]

In some embodiments, the offsets w, x, y, and z are selected through an analysis of walking vs. non-walking sequences and provide the greatest separation for detection purposes. With a 10 Hz update rate, analysis of the volume within which the accelerometer moves spans approximately 1.3 seconds. The system 100 may then determine the jostle J[n] metric based on the calculated volume according to Equation 7.

$$J[n] = V^{1/3} \quad \text{Equation 7}$$

The analysis of the GPS data can be a complicated process due, at least, to the inherent issues with the data itself. For example, GPS devices may receive individual location and time data points once every second (or more or less often), but the location or the time information in one or more of the received data points may be inaccurate. Such inaccuracies may impact analysis of the received GPS data that may result in state determinations for particular GPS data points, speed or acceleration determinations, and so forth.

Figure 12:
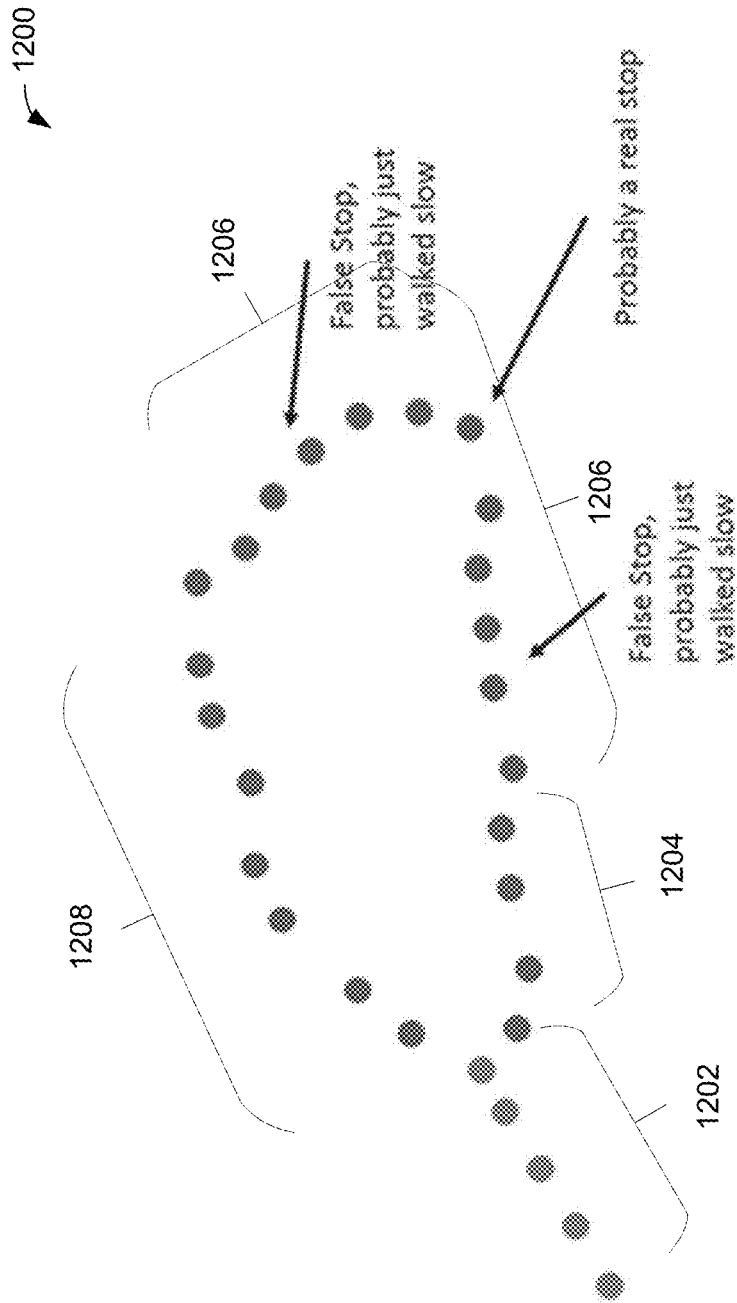
FIG. 12 shows a sequence of GPS data points that comprises four separate portions of GPS data points.

In some embodiments, the system 100 may implement one or more algorithms to identify inaccuracies based on the GPS data and/or other errors resulting from the analysis of the GPS data. For example, the system 100 may implement a false stop detection algorithm that determines when the GPS data has been erroneously analyzed to determine a stop exists where a stop did not actually occur. In some embodiments, the false stop detection algorithm is applied when the system 100 computes state probabilities for each GPS data point. In some embodiments, the false stop detection algorithm eliminates long stops, identified when analyzing the GPS data, that span across several GPS data points and look inaccurate when viewed on a map correlating the GPS data points along the route, and so forth. For example, FIG. 12 shows a sequence 1200 of GPS data points that comprises four separate portions of GPS data points. The GPS data points have been analyzed to determine a state of the item deliverer based on the information associated with that data point. The first set 1202 of data points may correspond to when the item deliverer is traveling in the delivery resource 110. The second set 1204 of data points may correspond to a period when the item deliverer is walking between locations. The third set 1206 of data points may correspond to a period when the item deliverer is stopped. The fourth set 1208 of data points may correspond to a period when the item deliverer is walking. The false stop detection algorithm as applied by the system 100 may determine that the third set 1206 of data points, which are analyzed to represent the item deliverer being in the stop state, are actually falsely indicating stops where only one of the GPS data points of the third set 1206 represent an actual stop. By applying the false stop detection algorithm, the system 100 may determine that many of the data points of the third set 1206 instead represent the item deliverer walking slowly. Details of the false stop detection algorithm are provided below.

The false stop detection algorithm may involve multiple steps. For example, the processor of the system 100 applying the false stop detection algorithm may save all consecutive stop points as unique groups. For example, each of the sets of data 1202, 1204, 1206, and 1208. Once the unique groups or sets of data are determined, the processor may then calculate a middle point of each unique group or data set. In some embodiments, the processor applies a probabilistic model to determine the best or most appropriate state for each other data point of the unique group or data set with respect to the middle point. By determining a distance, d, from the middle point for each other point of the unique group or data set, a probability of being stopped is adjusted according to the Equation 8, shown below.

$$p(d) = 1 - e^{-\left(\frac{d_t}{d}\right)}$$ Equation 8

Where dt is threshold distance.

Thus, as the distance increases (for example, the data point being examined is further away from the middle point), the probability of the state being stopped (similar to the middle point) decreases. By applying the false stop detection algorithm in this matter, data point states near the middle point of the unique group or data set are more likely to not be changed while outer data point states will change state if the newly computed probability is less than the next best state probability. In some embodiments, each state will have a threshold probability that will be used to determine the state for individual data points.

Figure 13:
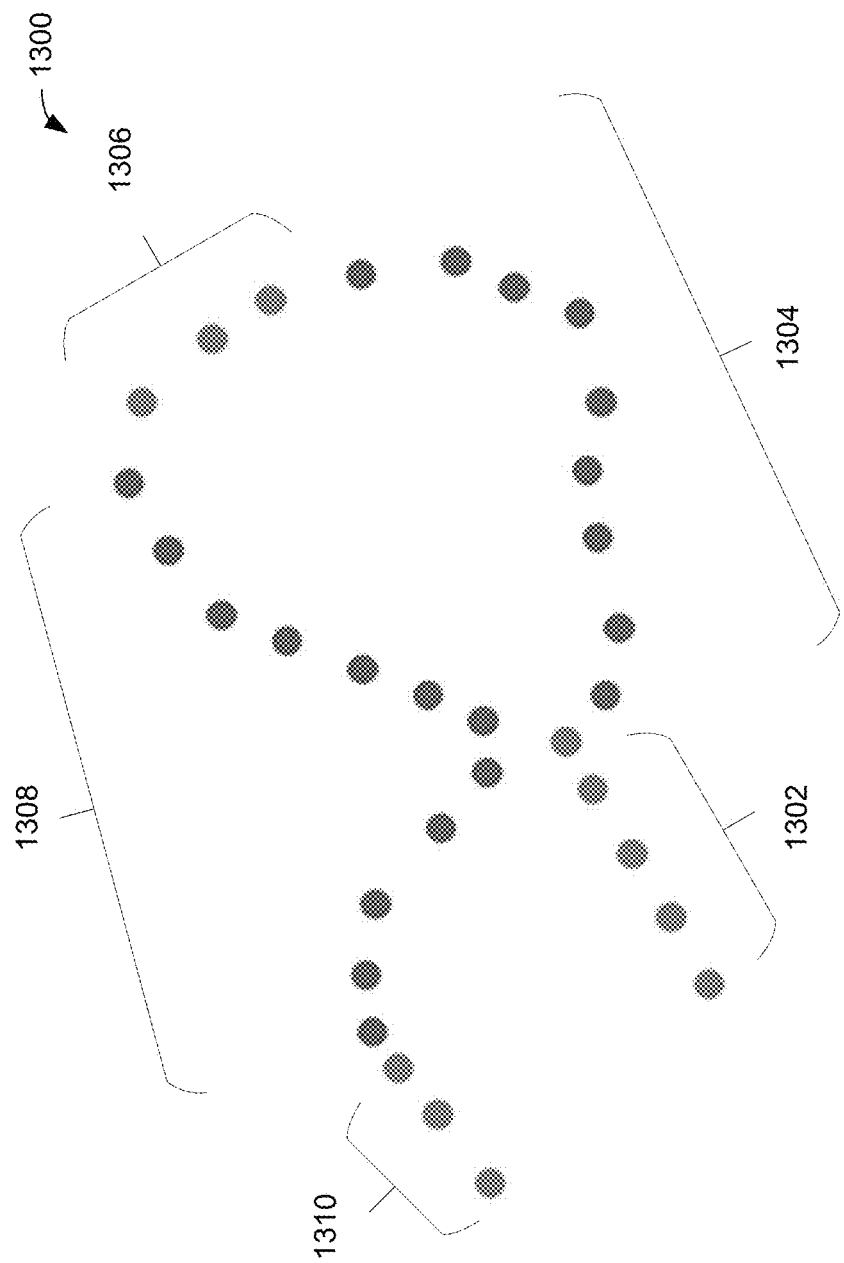
FIG. 13 shows a sequence of GPS data points that comprises five separate portions of GPS data points.

In some embodiments, the system 100 implements a false drive detection algorithm that determines when the GPS data has been erroneously analyzed to determine the item deliverer is driving when the item deliverer was not actually driving. In some embodiments, the false drive detection algorithm is applied when the system 100 computes state probabilities for each GPS data point or after the system 100 initially computes state probabilities. In some embodiments, the false drive detection algorithm eliminates falsely identified driving data point states when the item deliverer is actually walking or stopped. Such falsely identified data point states may span across several GPS data points and look inaccurate when viewed on a map correlating the GPS data points along the route, and so forth. For example, FIG. 13 shows a sequence 1300 of GPS data points that comprises five separate portions of GPS data points. The GPS data points have been analyzed to determine a state of the item deliverer based on the information associated with that data point. The first set 1302 of data points may correspond to when the item deliverer is driving in the delivery resource 110. The second set 1304 of data points may correspond to a period when the item deliverer is walking between locations. The third set 1306 of data points may correspond to a period when the item deliverer is driving. The fourth set 1308 of data points may correspond to a period when the item deliverer is walking. The fifth set 1310 of data points may correspond to a period when the item deliverer is driving. The false drive detection algorithm as applied by the system 100 may determine that the third set 1306 of data points, which are analyzed to represent the item deliverer being in the driving state, are actually falsely indicating driving where instead the item deliverer is walking for these GPS data points. By applying the false drive detection algorithm, the system 100 may determine that the data points of the third set 1306 instead represent the item deliverer driving. Details of the false drive detection algorithm are provided below.

The false drive detection algorithm may involve multiple steps. For example, the CPU 252 of the system 100 applying the false drive detection algorithm may save all location and time information for all GPS data points for a period being analyzed. For example, each of the sets of data 1302, 1304, 1306, 1308, and 1310. Once the unique groups or sets of data are determined, the processor may then determine an index between each GPS point is checked. If there are more than 3 GPS data points having the driving state assigned thereto between other sets of data that indicating the driving state, the Euclidean distance between the two sets of data having the driving state assigned thereto is calculated. Euclidian distance between all GPS points in an array of indices of GPS points marked as "driving" are calculated.

In some embodiments, the processor applies a probabilistic model to determine the best or most appropriate state for each data point based on the calculated distances. The CPU 252 may identify a distance between each pair of GPS points in the array. The CPU 252 may then check to see how many other GPS points in the array exist between the pair of GPS points being analyzed. For example, the CPU 252 may calculate the distance between points 1 and 2 and determine if there are any other points between 1 and 2 (2–1). If the value is less than three, then the CPU 252 will continue to a different pair of GPS points. However, if the number of points between the analyzed points is 5 or more, the CPU 252 will calculate a distance between the two points and then use Equation 8 to calculate the probability of the state between the pair of points. The CPU 252 may continue to process the array of GPS points based on this algorithm. Accordingly, the CPU 252 may next calculate the distance between GPS points 28 and 29 and determine if there are more than 3 points between them and continue to loop through the array. An example of the driving array is:

| 1 | 2 | 3 | 4 | 5 | 6  | 7  | 8  |
|---|---|---|---|---|----|----|----|
| 1 | 2 | 3 | 4 | 5 | 28 | 29 | 30 |

By determining the Euclidian distance, d, between the data points, a probability of the state for the data point being driving is adjusted according to the Equation 8.

Once the states for the GPS data points are determined based on the state probabilities described above, the system 100 may determine a state sequence, corresponding to a chronological series of consecutive GPS data points which all have or share a similar state. The system 100 may apply a state sequence algorithm that checks each GPS point, in order, and produces a state sequence based off a best state probability. When generating the state sequence, the system 100 may establish a state for the sequence (for example walk, drive, stop, and so forth), a duration of the state sequence (for example, in milliseconds), a cumulative distance of the state sequence (for example, in meters), and a Euclidean distance of the state sequence (for example, in meters). The system 100 may create a new state sequence for each state change. In some embodiments, state sequences allows the system 100 to perform logical filtering and correction of unusual scenarios (such as drive-walk-drive state sequences).

In some embodiments, when the GPS data is being analyzed, the GPS and similar data may be down-sampled or up-sampled.

In some embodiments, a speed value may be received from the MDD or other speedometer or similar device. In some embodiments, the speed is received from the GPS device or determined based on GPS data points. An acceleration of the delivery resource 110 may be determined by integrating the speed value. In some embodiments, the acceleration of the delivery resource 110 may be classified as one of an aggressive drive, an aggressive braking, or a non-aggressive drive or braking. The acceleration threshold(s) that determine aggressive from non-aggressive driving states may be configurable and/or dynamically adjusted. For example, an acceleration of +/−3 m/s² may be defined as aggressive driving.

Figure 14:
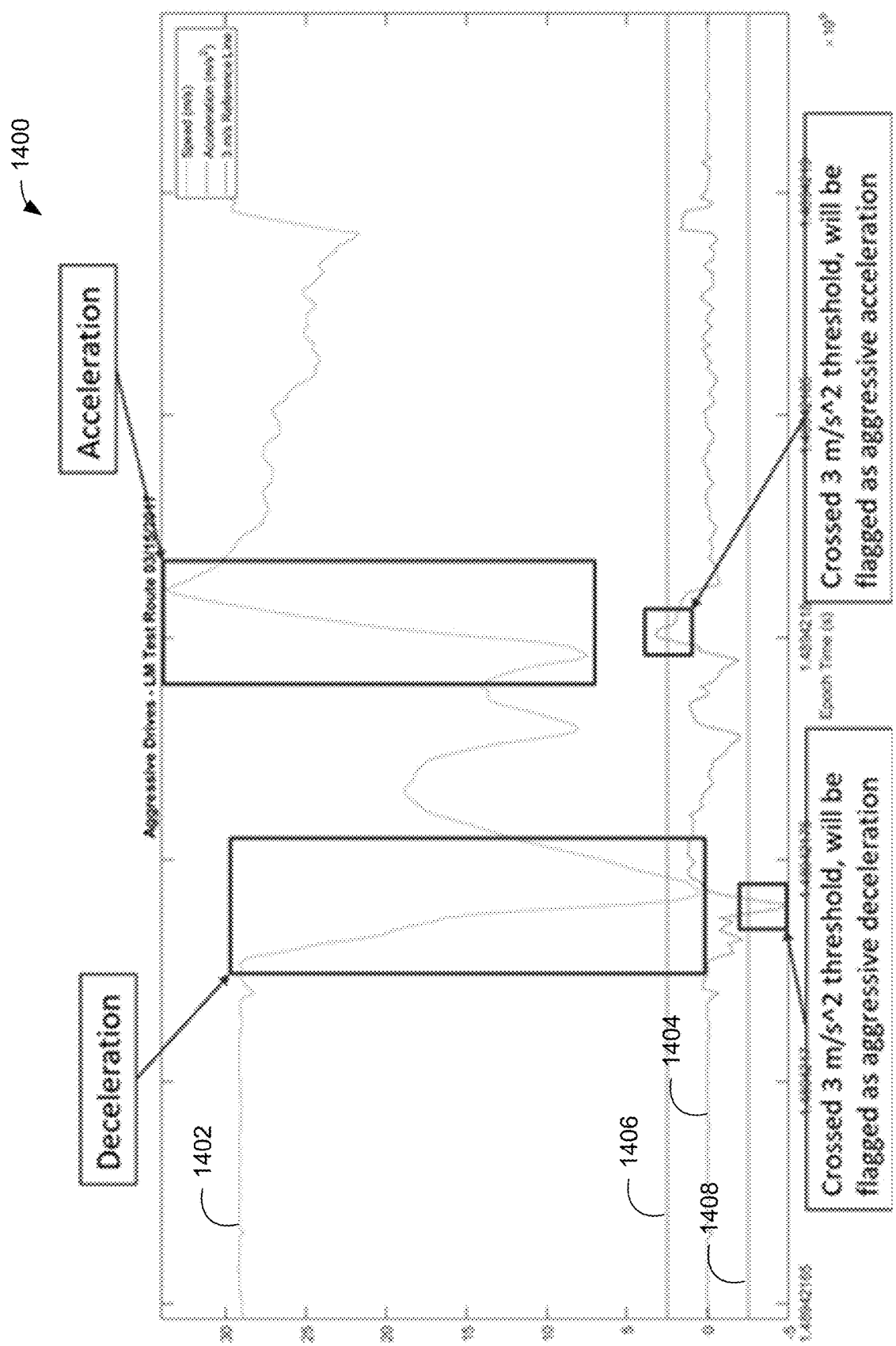
FIG. 14 shows a graph comparing velocity of the delivery resource and the corresponding acceleration of the delivery resource.

FIG. 14 shows a graph 1400 comparing velocity of the delivery resource 110 and the corresponding acceleration of the delivery resource 110. The graph 1400 shows acceleration and velocity on the y-axis as a function of time on the x-axis. As shown, a line 1402 representing velocity of the delivery resource 110 and a line 1404 representing acceleration of the delivery resource 110. The graph 1400 also includes a positive acceleration threshold and a negative acceleration threshold. If the line 1404 exceeds either of these thresholds, then the acceleration is "aggressive".

In some embodiments, the system 100 may generate one or more exception reports to identify areas where the item deliverer's MDD device was motionless for an excessive amount of time. For example, an exception reporting algorithm, as implemented by the system 100, identifies state sequences categorized as a "stop" with a duration longer than two minutes. For each of such identified state sequences, the system stores the corresponding latitude, longitude, duration, and time. In some embodiments, the final report generated by the exception reporting algorithm may provide a visual representation of the exception.

In some embodiments, the system 100 also tracks driving patterns of the delivery resources 110. The system 100 may track such driving patterns to identify unsafe activities, inefficient activities, and other activities that could be used to improve the route being serviced by the delivery resource 110 and the item deliverer. For example, the system 100 uses one or more driving algorithms to identify U-turns, left turns, reversing, and so forth.

In some embodiments, the driving algorithm(s) applied by the system 100 involves a sliding window that allows segments of the route traveled by the delivery resource to be analyzed as separate regions. The methodology behind region identification by the driving algorithm(s) may involve a "sliding window" to analyze small portions of the route. However, unlike some sliding window algorithms that analyze a fixed number of points in each window across a set of data, the driving algorithm(s) applied by the system 100 uses the physical distance between GPS data points to form the sliding window. Accordingly, a number of data points within each sliding window may vary and is inversely proportional to the speed of the delivery resource 110. In some embodiments, the length (for example, number of data points or distance covered by) of the sliding window varies depending on the driving pattern being identified. For example, when identifying turns (for example, left turns or U-turns), the sliding window may cover a distance of ~12 and ~24 meters for turns and when identifying reversing, the sliding window may cover a distance of ~12 meters.

Once the sliding window length is determined, the first and last index of the sliding window are determined. The system 100 may then determine the physical midpoint of the distance represented by the sliding window (for example, half of the sliding window size), as represented by Equations 9.1-9.3 below:

$$A=(\text{firstLatitude},\text{firstLongitude}, 0)$$

$$B=(\text{midLatitude},\text{midLongitude},0)$$

$$C=(\text{lastLatitude},\text{lastLongitude},0) \quad \text{Equations 9.1-9.3}$$

Based on these data points of the sliding window, vectors $\vec{u}$ and $\vec{v}$ may be generated by the driving algorithm(s) via the system 100 according to Equations 9.4-9.5 to connect the points A to B and B to C.

$$\vec{u}=[B-A]$$

$$\vec{v}=[C-B] \quad \text{Equations 9.4-9.5}$$

Figure 15:
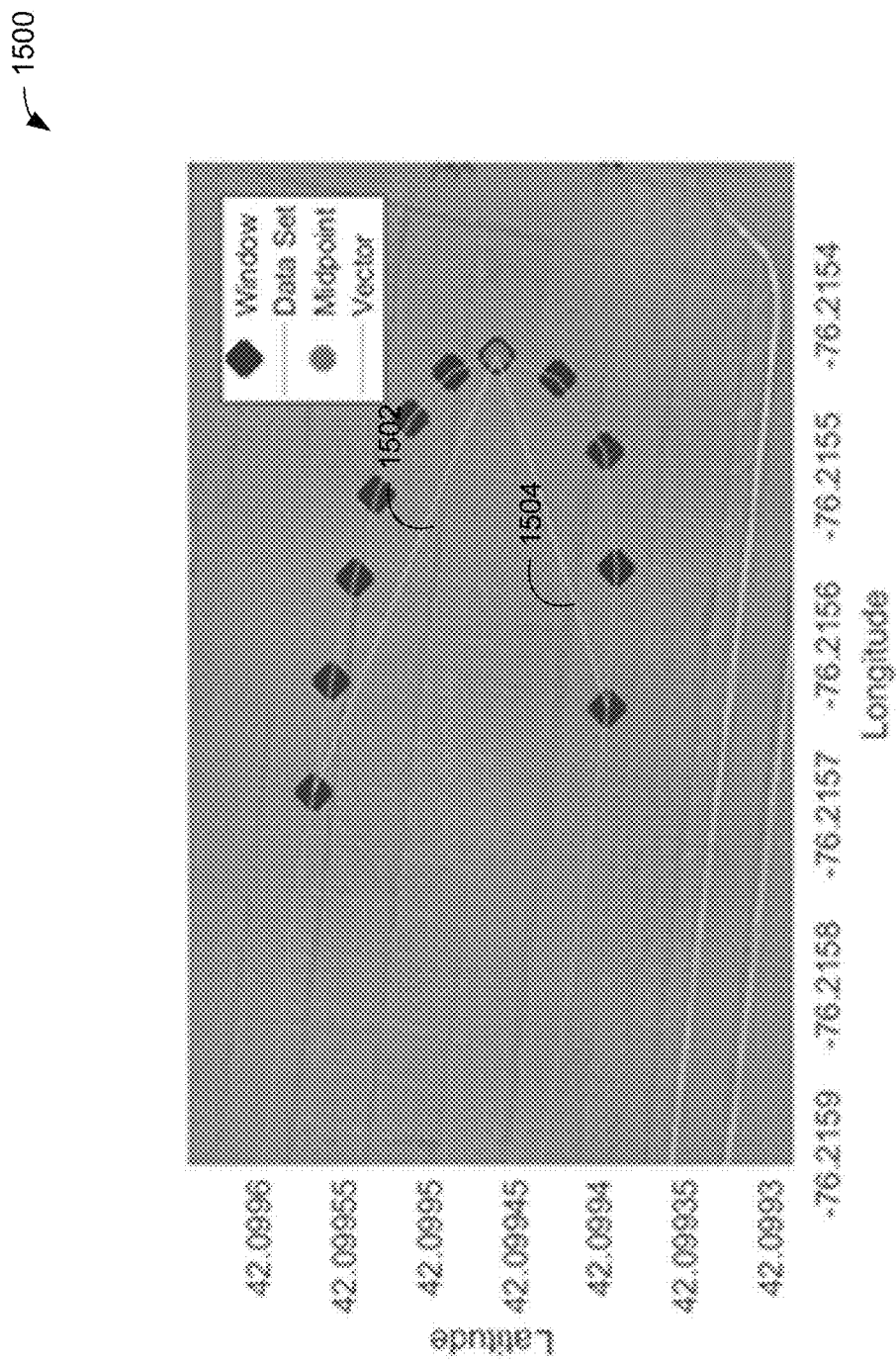
FIG. 15 shows a map including a route and stops with vectors $\vec{u}$ and $\vec{v}$.

FIG. 15 shows a map 1500 including a route 102 and stops 104 with vectors 1502 and 1504 representing vectors $\vec{u}$ and $\vec{v}$, respectively. The system 100 then applies the driving algorithm to compute an angle between the vectors $\vec{u}$ and $\vec{v}$ based on Equation 9.6:

$$\theta=180°-\text{abs}(a\tan 2(\|\vec{u}\times\vec{v}\|,\vec{u}\cdot\vec{v})) \quad \text{Equation 9.6}$$

Based on the result of θ, the driving pattern can be identified. For example, the driving pattern may be "reversing" if θ is 0°≤θ≤25° and may be a "turn" if 70°≤θ≤135°. To determine a type of turn, the system 100 applies the driving algorithm(s) to determine a cross product of the vectors $\vec{u}$ and $\vec{v}$ according to Equation 9.7 and identifies a z-component of the resulting three-dimensional vector to determine the type of turn. The simplified calculation for z is presented by Equation 9.8. If the value of z is positive, then the turn is a left turn.

$$\vec{u}\times\vec{v} \quad \text{Equation 9.7}$$

$$z=u_x*v_y-u_y*v_x \quad \text{Equation 9.8}$$

The system 100, using the driving algorithm(s), may identify turn candidate regions such that each turn candidate region meets the angle criteria mentioned above and is in a leftward direction based on the positive z vector. In some embodiments, the turn candidate region information is stored (for example, in memory) in a region object that includes the first, middle, and last indices of the region as well as an indication of the z vector value. In some embodiments, the system 100 identifies reverse regions based on the angle threshold above and confirmed by an additional check to verify if the first and last indices of the region are within 0.0000006 meters (for example, in a direction orthogonal to an axis of forward/reverse motion). If both conditions are met, then the driving algorithm (f) identifies a stop segment and walks the subsequent segments calculating the distance until the next stop segment. If this distance is less than 60 meters, a reverse region candidate is created from the start point of the region and the index of the final stop segment. If the distance is greater than 60 meters, the region is ignored.

Once the driving algorithm completes the region processing, any overlapping regions are combined to form regions to analyze for turning or reversing driving patterns. Only same type regions can be combined: reversing with reversing and turning with turning. For example, FIG. 16 shows how four "turn" regions can be combined into a single turn region.

Figure 16:
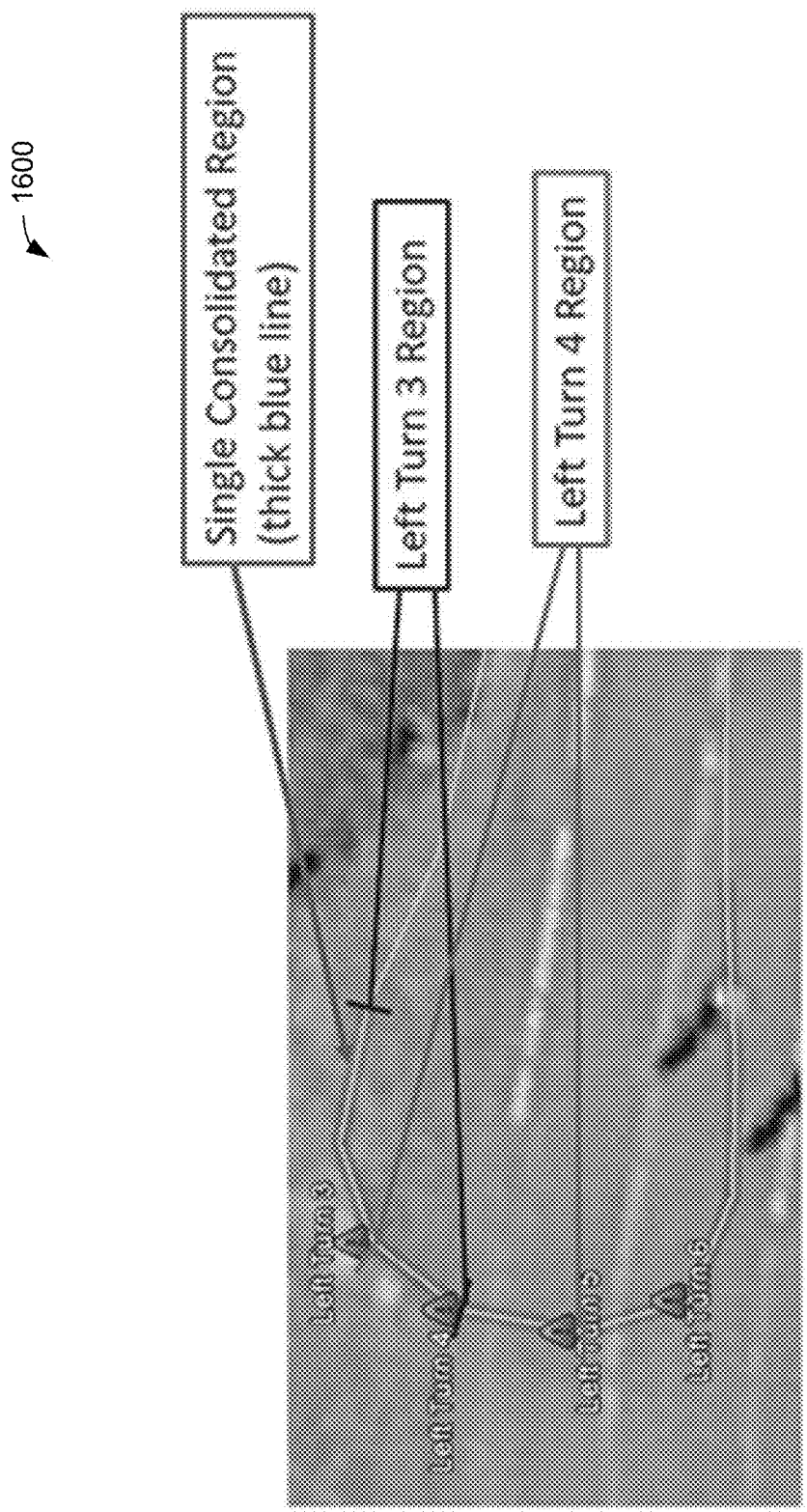
FIG. 16 shows a map including the route traveled by the delivery resource, where a plurality of individual turn regions is combined into a single turn region representing a U-turn.
Figure 17:
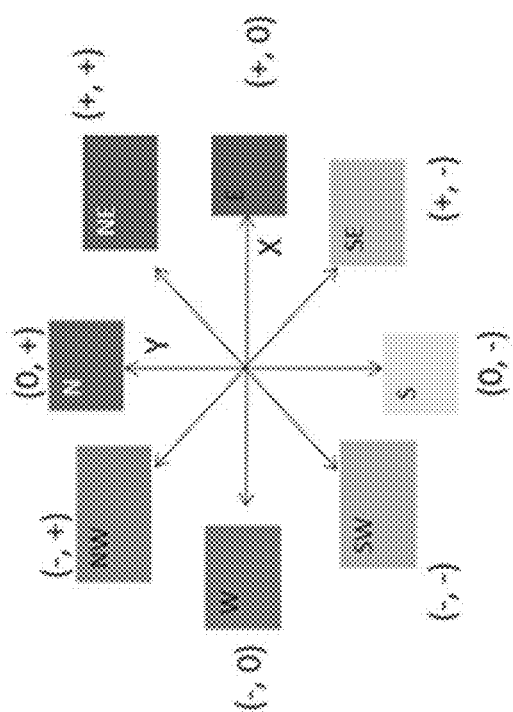
FIG. 17 shows a compass having primary directions of north (N), south (S), east (E), and west (W) are represented by the cardinal directions on an x-y axes.

FIG. 16 shows a map 1600 including the route 102 traveled by the delivery resource 110, where a plurality of individual turn regions is combined into a single turn region representing a U-turn. The driving algorithm applied by the system 100 identifies a list of unit vectors for each pair of points within the combined turn region. The unit vectors may include direction, motion state, beginning and ending index of the pair of points defining the vector, and distance between the pair of points. In some embodiments, the direction of the unit vector is determined based on the magnitude of the x and y components of the graph shown in FIG. 17. As shown in the compass shown in FIG. 17, primary directions of north (N), south (S), east (E), and west (W) are represented by the cardinal directions on an x-y axes. N is (0,+), E is (+,0), S is (0,−), and W is (−,0). A range between −0.5 and 0.5 may correlate to the "0" magnitude. Differentiating between the different runs then becomes a matter of using unit vector features to identify the various turns.

The system 100, via the driving algorithm(s), may identify a U-turn by first identifying a left turn formed by two unit vectors having a motion state of "drive". A left turn may be a single step leftward (or counterclockwise) along the compass of FIG. 17. From the left turn, the system 100 may apply the driving algorithm to analyze an 8 second window of unit vectors following the left turn to identify one or more of the following features that may represent a U-turn:
- 4 consecutive left turns, counting the original left turn, which denotes a 180 degree direction change
- All unit vectors in the sequence are in the Drive motion state
- A total distance between 9 meters and 25 meters based on empirical data A left turn may be a region consisting of only unit vectors having 1-3 leftward direction changes.

The system 100 may determine reverse direction driving based on finding stop unit vectors using the driving algorithm. Any stops that are not the first or last unit vectors in the list of stop unit vectors are analyzed as potential reversing periods or regions. Around each stop, the system 100 may use the driving algorithm to search a sequence of roughly straight vectors before and after the stop. A straight sequence may be a sequence of driving unit vectors that are all within, at most, 2 different consecutive directions according to the compass of FIG. 17. For example, a sequence of all North and North East vectors may be considered a straight sequence. The driving algorithm may determine whether the sequence leading into the stop is at least 5 meters in total length and the sequence exiting the stop must be greater than 15 meters. If not, then the stop is not a reverse region. If so, then the driving algorithm determines whether the sequences around the stop are roughly opposite in direction. Opposite directions are defined as the direction directly opposite to a defined direction and its neighboring two directions along the compass of FIG. 17. For example, the directions opposite East would be West, Northwest, and Southwest. If the driving algorithm determines that all of these conditions are met for the sequences around the stop, then the set of vectors is considered a reverse and the distance of the vector sequence leaving the stop is saved as the total distance of the reverse region.

Once the system 100 determines all valid driving patterns along the route traveled by the delivery resource 110, the system may store all the valid driving patterns as a driving report. In some embodiments, the driving report contains the time, latitude/longitude, and a number signifying the type of driving pattern: "1" for U-turns, "2" for left turns, "3" for three point turns, "4" for reverse.

The system 100 may square the route 102 using a squaring algorithm that is similar to the driving algorithm(s) described above. However, the squaring algorithm may utilize the sliding window in which the distance and vectors formed thereof is derived from walking rather than driving. Angles between the unit vectors that are less than 45 degrees are determined by the system 100 to be a 180 degree turn, which may be typical of the item deliverer's route when he/she walks up and down the sidewalk leading to a door or stop location as opposed to cutting across a yard or lawn. In turn identification described above, three points are used to generate two vectors. In route squaring, the squaring algorithm uses five points are used to calculate four vectors and three angles therebetween to identify a specific pattern.

The squaring algorithm uses a window of data points having a window size of 32 and only applies when the item deliverer or carrier is in the "walking" state. The first point is the starting GPS point of the window. The second point is determined when the item deliverer's window walking distance reaches a quarter of the window size. The third point, which is the midpoint, is determined when the item deliverer reaches half the window size. The fourth point is when item deliverer walks three quarters of the window size. The fifth and final point is set to the end of the window (when the item deliverer walks approximately 32 meters).

Once the all five points are determines, the 3 angles are calculated using similar processing as described above for the turn identification. The first angle is found using points 1, 2, and 3 according to Equations 9.1-9.3 based on the vectors according to Equations 9.4-9.5 and Equation 9.6.

Figure 18:
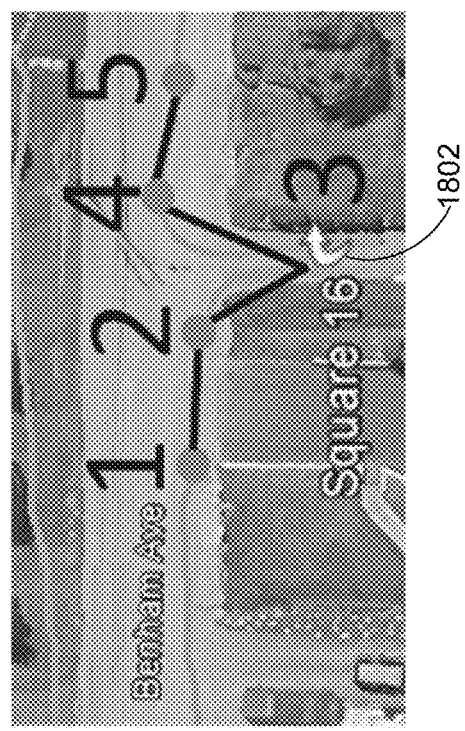
FIG. 18 shows a portion of a map including a marker identifying a midpoint of a sequence of turns.

$A = (\text{Point 1}, \text{Point 1}, 0)$ $B = (\text{Point 2}, \text{Point 2}, 0)$ $C = (\text{Point 3}, \text{Point 3}, 0)$ $\vec{u} = [B - A]$ $\vec{v} = [C - B]$ $\theta = 180° - \text{abs}(a \tan 2(\|\vec{u} \times \vec{v}\|, \vec{u} \cdot \vec{v}))$ The other 2 angles are found the same way, except they use different points. For example, the second angle uses points 2, 3, and 4 in A, B, and C, while the third angle uses points 3, 4, and 5. Next, the system 100 may apply checks to ensure that the angles are conform to the above pattern. For example, the system 100 may use the squaring algorithm to first check to see if each angle is within its respective range, where angle 1 is 80°≤θ≤135°, angle 2 is 40°≤θ≤55°, and angle 3 is 80°≤θ≤135°. The squaring algorithm then checks to ensure that the angles 1 and 3 are both either left turns or right turns. The z component is calculated for both angles using the Equation 9.8 above. If the z value is positive, the turn is considered a left turn. Otherwise, it is considered a right turn. Both angles 1 and 3 must be either left turns or right turns. If all the conditions above are satisfied, a marker 1802 will be placed on the midpoint for display on a map, as shown in FIG. 18.

Figure 19:
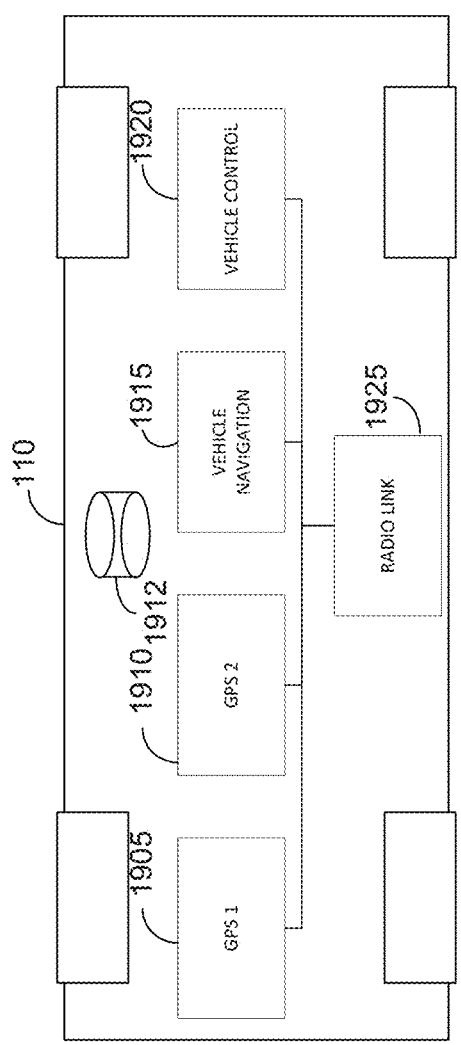
FIG. 19 is a block diagram of an exemplary delivery resource.

FIG. 19 is a block diagram of an exemplary delivery vehicle 110. The delivery vehicle 110 shown in FIG. 19 may be an exemplary embodiment of the delivery resource 110 shown in FIG. 1. The exemplary delivery vehicle 110 includes a first global positioning system (GPS) receiver 1905, a second GPS receiver 1910, a vehicle navigation component 1915, a vehicle control component 1920, and a radio link 1925. The radio link 1925 may enable one or more of the first GPS receiver 1905, second GPS receiver 1910, vehicle navigation component 1915, or vehicle control component 1920 to communicate wirelessly with other components of the disclosed methods and systems, such as any of the components shown in FIG. 2.

The first GPS receiver 1905 and second GPS receiver 1910 may receive GPS signals from GPS satellites to determine a position of the delivery vehicle 110. This information may be reported, via the radio link provided via radio link component 1925, to for example, the location management component 220 in some aspects. This may enable the disclosed methods and systems to maintain a current record of a location, heading, speed, etc., of the delivery vehicle 110, and of multiple delivery vehicles 110 managed by the delivery system, such that the delivery system is able to monitor and/or adjust routes 102 as necessary to improve efficiencies.

The vehicle navigation component 1915 may control navigation of the delivery vehicle 110 along a route. Route information may be retrieved from the route database 1912. In some aspects, the vehicle navigation component 1915 may receive route updates via the radio link 1925, from, for example, the route control component 230, illustrated with respect to FIG. 2. The vehicle navigation component 1915 may provide instructions to the vehicle control component 1920. For example, the vehicle navigation component 1915 may send commands such as a command to turn the delivery vehicle 110 to a particular heading, stop the delivery vehicle 110, or drive the delivery vehicle 110 at a particular speed to the vehicle control component 1920.

The vehicle control component 1920 may provide autonomous, electronic control of the delivery vehicle 110 in some aspects. As discussed above, the vehicle control component 1920 may receive commands such as a command to turn to a particular heading, stop, or drive at a particular speed from a vehicle navigation component. The vehicle control component 1920 may maintain electronic interfaces with vehicle systems, such as braking systems, engine systems, and steering systems (not shown in FIG. 19) that can affect the commands received from the vehicle navigation component. In aspects of the delivery vehicle 110 that may be manually controlled by a human operator, the vehicle control component 1920 may function to display instructions to the human operator to effect particular routes. For example, upon receiving a command to move the vehicle to a particular address, the vehicle control component 1920 may display the address on a display screen of the vehicle, such that the human operator can read the display screen and drive the vehicle to the address. In some aspects, the human operator may be assisted by a navigation application that provides route information to the commanded address.

In some embodiments, the analysis and determinations of the carrier's route described above may be used to determine a need for or trigger a review and/or revising of the carrier's route. For example, if the delivery system 100, the route management component 205, and/or the subsystem 250 determine that the inputs from various sources indicate aspects of the carrier's route should be updated. For example, if the carrier's route, as shown by the analysis described herein, indicates that the carrier's route results in the carrier traveling a single section of road multiple times, the delivery system 100 may determine that the carrier's route can be optimized to minimize repeatedly traveling the single section of road. In another example, where the analysis of the carrier's route indicates that the carrier must travel at excessive or dangerous speeds to meet time requirements of the carrier's route, the delivery system 100 may determine that the carrier's route should be revised to ensure only safe speeds are required to meet deadlines of the route.

In some embodiments, when the delivery system 100 (or other component) determines that one carrier's route includes much more walking than a neighboring carrier's route, the system may determine to modify both routes to ensure both carriers have routes with similar requires and aspects. In some embodiments, the analysis of routes described herein may result in one or more routes being modified, routes being merged, routes being broken up and redistributed, and so forth to ensure that different carriers have similar routes or routes with similar aspects. Thus, based on the analysis herein, the delivery system 100 may adapt one or more routes to ensure that the routes are generally optimized and consistent between carriers while being safe.

ADDITIONAL EMBODIMENTS

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A system for tracking device movement, the system comprising:
    a mobile computing device comprising:
        a global positioning system generating location values;
        an accelerometer generating acceleration values; and
        wherein the mobile computing device is configured to generate data points each of the data points comprising location, acceleration, and time values;
    a memory circuit storing a plurality of carrier routes and the data points; and
    one or more processors in communication with the mobile computing device, the one or more processors configured to:
        receive, data points from the mobile computing device, each of the data points comprising location, acceleration, and time values generated during a first instance of an item carrier traveling a route of the plurality of carrier routes;
        query, the memory circuit, to identify the route of the plurality of carrier routes traveled by the item carrier based on the received location values,
        for each of the data points, filter the acceleration values to subtract a constant gravity component;
        identify an acceleration envelope of the filtered acceleration values;
        determine a dynamic step threshold based on the filtered acceleration data;
        for each of the data points which exceeds the dynamic step threshold, determine that a step occurred;
        for ones of the data points where a step has occurred, identify a walking state for the ones of the data points;
        for others of the data points where a step has not occurred, determine a jostle metric based on the acceleration values;
        based on the determined jostle metric, identify either a driving state or a stopped state for the others of the data points; and
        based on the identified driving states and stopped states for the others of the data points, cause, via a vehicle control component, a vehicle associated with the mobile computing device to change heading.

2. The system of claim 1, wherein the accelerometer comprises a gyroscope, and wherein the acceleration values comprise gyroscope data.

3. The system of claim 1, wherein the one or more processors are further configured to verify the identified state for each of the data points by:
    applying, for the each of the received data points, an algorithm to the data points within a threshold time period of the each of the received data points, and
    determining, for the each of the received data points, that the identified state is consistent for the data points within the threshold time period.

4. The system of claim 1, wherein for data points identified as driving states, the one or more processors are further configured to determine whether the driving state is one of driving, turning, and reversing.

5. The system of claim 1, wherein when for data points identified as driving states, the one or more processors are further configured to identify at least one driving action taken by the item carrier.

6. The system of claim 5, wherein the at least one driving action comprises at least one of turning, reversing, aggressive accelerating, and aggressive decelerating.

7. The system of claim 6, wherein the one or more processors are further configured to identify the at least one driving action taken by the item carrier by:
    generating a plurality of vectors between a first set of data points and a second set of data points;
    identifying at least one angle between the generated plurality of vectors; and
    selecting one of the turning and reversing driving action based at least in part on the identified at least one angle.

8. The system of claim 1, wherein the processor is further configured to verify the identified state for first, second, and third segments using a false stop detection algorithm and a false drive detection algorithm.

9. The system of claim 1, wherein the one or more processors are further configured to identify ones of the data points where a step has occurred by:
setting a dynamic step threshold by taking a square root mean over time of peaks of the acceleration values; and
identifying as steps data points having acceleration values above the dynamic step threshold.

10. The system of claim 1, wherein the one or more processors are configured to determine the jostle metric by:
setting a volume within which accelerometer values are assumed to bounded when the carrier is walking; and
identifying, for data points having accelerometer values less than the jostle metric, driving states or stopped states.

11. A method of analyzing device movement, the method comprising:
storing a plurality of carrier routes in a memory circuit;
receiving, in one or more processors, from a mobile computing device, data points from a mobile computing device, each of the data points comprising location, acceleration, and time values generated during a first instance of an item carrier traveling a route of the plurality of carrier routes, wherein mobile computing device comprises a global positioning system and an accelerometer, and wherein the location values are generated by the global positioning system, and the acceleration values are generated by the accelerometer;
identifying, based on the received location values, the route of the plurality of routes traveled by the item carrier;
filtering the acceleration values to subtract a constant gravity component;
identifying an acceleration envelope of the filtered acceleration values;
determining a dynamic step threshold based on the filtered acceleration data;
for each of the data points which exceeds the dynamic step threshold, determining, that a step occurred;
identifying, in the one or more processors, for ones of the data points where a step has occurred, a walking state for the ones of the data points;
determining, in the one or more processors, for others of the data points where a step has not occurred, a jostle metric based on the acceleration values;
identifying, in the one or more processors, based on the jostle metric, either a driving state or a stopped state for the others of the data points; and
based on the identified driving states and stopped states for the others of the data points, causing, via a vehicle control component, a vehicle associated with the mobile computing device to change heading.

12. The method of claim 11, wherein the mobile computing device is carried by the item carrier or is part of the vehicle driven by the item carrier.

13. The method of claim 11, wherein the accelerometer comprises a gyroscope, and wherein the acceleration values comprise gyroscope data.

14. The method of claim 11, further comprising:
applying, for the each of the received data points, an algorithm to the data points within a threshold time period of the each of the received data points; and
determining, for the each of the received data points, that the identified state is consistent with other data points within the threshold time period of the each of the received data points.

15. The method of claim 11, wherein the method further comprises, for data points identified as driving states, identifying at least one driving action taken by the item carrier.

16. The method of claim 15, wherein the at least one driving action comprises at least one of turning, reversing, aggressive accelerating, and aggressive decelerating.

17. The method of claim 16, wherein identifying the at least one driving action taken by the item carrier comprises:
generating a plurality of vectors between a first set of data points and a second set of data points;
identifying at least one angle between the generated plurality of vectors; and
selecting one of the turning and reversing driving action based at least in part on the identified at least one angle.

18. The method of claim 11, wherein verifying the identified state for each of a first, second, and third segment comprises using a false stop detection algorithm and a false drive detection algorithm.

19. A non-transitory computer readable medium comprising instruction that, when implemented by at least one computer processor, cause the computer processor to perform the steps of:
storing a plurality of carrier routes in a memory circuit;
receiving, in one or more processors, from a mobile computing device, data points, each of the data points comprising location, acceleration, and time values generated during a first instance of an item carrier traveling a route of the plurality of carrier routes, wherein mobile computing device comprises a global positioning system and an accelerometer, and wherein the location values are generated by the global positioning system, and the acceleration values are generated by the accelerometer;
receiving the data points;
identifying, based on the received location values, the route of the plurality of routes traveled by an item carrier;
filtering the acceleration values to subtract a constant gravity component;
identifying an acceleration envelope of the filtered acceleration values;
determining a dynamic step threshold based on the filtered acceleration data;
for each of the data points which exceeds the dynamic step threshold, determining, that a step occurred;
identifying, in the one or more processors, for ones of the data points where a step has occurred, a walking state for the ones of the data points;
determining, in the one or more processors, for others of the data points where a step has not occurred, a jostle metric based on the acceleration values;
identifying, in the one or more processors, based on the jostle metric, either a driving state or a stopped state for the others of the data points; and
based on the identified driving states and stopped states for the others of the data points, causing, via a vehicle control component, a vehicle associated with the mobile computing device to change heading.

* * * * *